(12) United States Patent
Kikuchi et al.

(10) Patent No.: US 9,273,582 B2
(45) Date of Patent: Mar. 1, 2016

(54) HONEYCOMB STRUCTURE AND MANUFACTURING METHOD OF THE SAME

(71) Applicant: NGK Insulators, Ltd., Nagoya (JP)

(72) Inventors: Yoshio Kikuchi, Nagoya (JP); Takashi Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 6 days.

(21) Appl. No.: 14/187,752

(22) Filed: Feb. 24, 2014

(65) Prior Publication Data

US 2014/0294691 A1 Oct. 2, 2014

(30) Foreign Application Priority Data

Mar. 29, 2013 (JP) ................................. 2013-075368

(51) Int. Cl.
| | | |
|---|---|---|
| *B01D 59/50* | (2006.01) | |
| *B01D 50/00* | (2006.01) | |
| *F01N 3/28* | (2006.01) | |
| *B01D 46/24* | (2006.01) | |
| *F01N 3/20* | (2006.01) | |

(52) U.S. Cl.
CPC .......... *F01N 3/2803* (2013.01); *B01D 46/2418* (2013.01); *B01D 46/2429* (2013.01); *F01N 3/2026* (2013.01); *F01N 3/2828* (2013.01); *Y10T 29/49204* (2015.01)

(58) Field of Classification Search
CPC ... B01D 46/0063; F01N 3/2012; F01N 3/027; F01N 3/2026; F01N 2240/16
See application file for complete search history.

(56) References Cited

U.S. PATENT DOCUMENTS

| | | | | |
|---|---|---|---|---|
| 5,200,154 A | * | 4/1993 | Harada et al. ................. | 422/174 |
| 5,229,079 A | * | 7/1993 | Harada et al. ................. | 422/174 |
| 5,245,825 A | * | 9/1993 | Ohhashi et al. ................ | 60/300 |
| 5,259,190 A | * | 11/1993 | Bagley et al. ................... | 60/300 |
| 5,876,787 A | * | 3/1999 | Avarbz et al. ................... | 427/79 |
| 8,158,908 B2 | * | 4/2012 | Konieczny et al. ........... | 219/202 |

(Continued)

FOREIGN PATENT DOCUMENTS

| | | |
|---|---|---|
| JP | 2010-229976 | 10/2010 |
| WO | 2011/043434 | 4/2011 |

(Continued)

OTHER PUBLICATIONS

Shigeo Hayashi et al., "*Accuracy in the Quantitative Phase Analysis of Eight- to Ten-Component Ceramic Materials Using the Whole-Powder-Pattern Fitting Methods*," Journal of the Ceramic Society of Japan, 1999, vol. 107, No. 3, pp. 249-257.

(Continued)

*Primary Examiner* — Amber R Orlando
(74) *Attorney, Agent, or Firm* — Burr & Brown, PLLC

(57) ABSTRACT

A honeycomb structure includes a tubular honeycomb structure body having porous partition walls to define and form a plurality of cells, and an outer peripheral wall; and a pair of electrode sections disposed on a side surface of the honeycomb structure body, an electrical resistivity of the honeycomb structure body is from 1 to 200 Ωcm, each of the pair of electrode sections is formed into a band shape extending in an extending direction of the cells, the electrode section contains silicon and an aggregate, and a ratio (the silicon/the aggregate) of a volume of the silicon to be contained in the electrode section to a volume of the aggregate to be contained in the electrode section is from 60/40 to 80/20.

20 Claims, 3 Drawing Sheets

(56) References Cited

U.S. PATENT DOCUMENTS

| | | | |
|---|---|---|---|
| 2005/0067672 A1* | 3/2005 | Toyoda et al. | 257/565 |
| 2010/0229629 A1* | 9/2010 | Egami et al. | 73/28.01 |
| 2012/0003420 A1* | 1/2012 | Betsushiyo et al. | 428/116 |
| 2012/0076698 A1* | 3/2012 | Ishihara | 422/174 |
| 2012/0076699 A1* | 3/2012 | Ishihara | 422/174 |
| 2012/0187109 A1 | 7/2012 | Noguchi et al. | |
| 2013/0036719 A1 | 2/2013 | Noguchi et al. | |
| 2013/0043237 A1 | 2/2013 | Sakashita et al. | |

FOREIGN PATENT DOCUMENTS

| | | |
|---|---|---|
| WO | 2011/105567 | 9/2011 |
| WO | 2011/125817 | 10/2011 |
| WO | 2014/045681 A1 | 3/2014 |

OTHER PUBLICATIONS

U.S. Appl. No. 14/187,867, filed Feb. 24, 2014, Kikuchi et al.
Extended European Search Report (Application No. 14159741.9) dated Sep. 18, 2014.

* cited by examiner

HONEYCOMB STRUCTURE AND MANUFACTURING METHOD OF THE SAME

The present application is an application based on JP-2013-75368 filed on Mar. 29, 2013 with the Japanese Patent Office, the entire contents of which are incorporated herein by reference.

BACKGROUND OF THE INVENTION

1. Field of the Invention

The present invention relates to a honeycomb structure, and a manufacturing method of the honeycomb structure. More particularly, it relates to a honeycomb structure which is a catalyst carrier, and also functions as a heater when a voltage is applied thereto, and a manufacturing method of the honeycomb structure.

2. Description of Related Art

Heretofore, a honeycomb structure of cordierite onto which a catalyst is loaded has been used in a treatment of harmful substances in an exhaust gas discharged from a car engine. Moreover, it is known that a honeycomb structure formed of a sintered body of silicon carbide is used in purification of the exhaust gas. When the exhaust gas is treated by the catalyst loaded onto the honeycomb structure, it is necessary to raise a temperature of the catalyst to a predetermined temperature. However, at start of the engine, the catalyst temperature is low, which has caused the problem that the exhaust gas cannot sufficiently be purified.

Thus, there has been suggested a honeycomb structure which is a catalyst carrier, and also functions as a heater when a voltage is applied thereto (e.g., see Patent Documents 1 to 4).

In Patent Documents 1 to 3, there is disclosed a honeycomb structure including a tubular honeycomb structure body, and a pair of electrode sections disposed on a side surface of this honeycomb structure body. The honeycomb structure body has porous partition walls to define and form a plurality of cells, and an outer peripheral wall. In Patent Document 1, it is described that a volume electrical resistivity of the honeycomb structure body at 400° C. is from 1 to 40 Ωcm, and a volume electrical resistivity of the electrode sections at 400° C. is 40% or less of the volume electrical resistivity of the honeycomb structure body. In Patent Document 2, electrode sections containing silicon (Si) and silicon carbide (SiC) are described. In the electrode sections of Patent Document 2, an average particle diameter of silicon carbide particles is from 10 to 70 µm, and a ratio (Si/SiC) of a mass between silicon (Si) and silicon carbide (SiC) is from 20/80 to 50/50. Furthermore, in Patent Document 3, it is described that in a cross section perpendicular to a cell extending direction, an angle of 0.5 times a central angle of each electrode section is from 15 to 65°. Further, in Patent Document 3, it is described that each electrode section is formed to be thinner from a central portion in a peripheral direction of the honeycomb structure body toward both ends in the peripheral direction, in the cross section perpendicular to the cell extending direction. Further, in Patent Document 4, there is disclosed a honeycomb body for energization heat generation made of a conductive material, and including a plurality of through holes which are divided by partition walls and are substantially parallel to a gas flow direction, and both end surfaces on a gas inflow side and a gas outflow side. This honeycomb body for energization heat generation further includes electrode sections having a low volume resistivity and a heat generating section having a high volume resistivity, and the electrode sections are formed on both the whole end surfaces. Furthermore, in this honeycomb body for energization heat generation, the volume resistivity of the heat generating section is from 0.1 to 10 Ωcm, and the volume resistivity of the electrode sections is 1/10 or less of the volume resistivity of the heat generating section.

[Patent Document 1] WO 2011/043434
[Patent Document 2] WO 2011/105567
[Patent Document 3] WO 2011/125817
[Patent Document 4] JP-A-2010-229976

SUMMARY OF THE INVENTION

However, in a honeycomb structure which also functions as a conventional heater, a current does not easily flow evenly through a honeycomb structure body, which has caused the problem that a portion which is not easily heated is created in the honeycomb structure body. That is, in the conventional honeycomb structure, a resistance of electrode sections is not sufficiently low as compared with the honeycomb structure body, and hence a current supplied from a predetermined power source to the electrode sections disadvantageously preferentially flows from a portion close to a position to which the current has been supplied to the honeycomb structure body sometimes before the current is transmitted to all regions of the electrode sections. As a result, in the honeycomb structure body, heat is noticeably generated in a portion through which the current preferentially flows, whereas the heat is not sufficiently generated in a portion through which the current does not easily flow. In this way, temperature unevenness (i.e., heat generation unevenness) occurs in the conventional honeycomb structure which also functions as the heater sometimes during the heat generation.

The present invention has been developed in view of the above-mentioned problems, and an object thereof is to provide a honeycomb structure which is a catalyst carrier, and also functions as a heater when a voltage is applied thereto, and which can further lower an electrical resistivity of electrode sections and decrease temperature unevenness during heat generation.

To achieve the above-mentioned object, according to the present invention, there are provided the following honeycomb structure and the following manufacturing method of the honeycomb structure.

According to a first aspect of the present invention, a honeycomb structure including a tubular honeycomb structure body having porous partition walls to define and form a plurality of cells as through channels of a fluid which extend from a first end surface as one end surface to a second end surface as the other end surface, and an outer peripheral wall positioned on the outermost periphery is provided; and a pair of electrode sections disposed on a side surface of the honeycomb structure body, wherein an electrical resistivity of the honeycomb structure body is from 1 to 200 Ωcm, each of the pair of electrode sections is formed into a band shape extending in an extending direction of the cells of the honeycomb structure body, in a cross section perpendicular to the extending direction of the cells, the one electrode section in the pair of electrode sections is disposed on a side opposite to the other electrode section in the pair of electrode sections via the center of the honeycomb structure body, the electrode section contains silicon and an aggregate, and a ratio (the silicon/the aggregate) of a volume of the silicon to be contained in the electrode section to a volume of the aggregate to be contained in the electrode section is from 60/40 to 80/20.

According to the second aspect of the present invention, the honeycomb structure according to the above first aspect is provided, wherein an average particle diameter of the aggregate is from 0.1 to 5 µm.

According to the third aspect of the present invention, the honeycomb structure according to the above first or second aspect is provided, wherein the aggregate includes particles made of a material including at least one selected from the group consisting of silicon carbide, silicon nitride, mullite, and alumina.

According to a fourth aspect of the present invention, the honeycomb structure according to the above third aspect is provided, wherein the aggregate includes particles made of silicon carbide and particles made of mullite, and a ratio (the silicon carbide/the mullite) of a volume of the particles made of the silicon carbide to a volume of the particles made of the mullite is from 20/80 to 80/20.

According to a fifth aspect of the present invention, the honeycomb structure according to any one of the above first to fourth aspects is provided, wherein the electrode section further contains an alkaline earth metal oxide, $Al_2O_3$, and $SiO_2$.

According to a sixth aspect of the present invention, the honeycomb structure according to the above fifth aspect is provided, wherein the alkaline earth metal oxide is MgO.

According to a seventh aspect of the present invention, the honeycomb structure according to the above fifth or sixth aspects is provided, wherein the electrode section contains the alkaline earth metal oxide, $Al_2O_3$, and $SiO_2$ as much as 2 to 10 parts by volume in total, when a total volume of the silicon and the aggregate is 100 parts by volume.

According to an eight aspect of the present invention, the honeycomb structure according to any one of the above first to seventh aspects is provided, wherein the electrode section contains at least one selected from the group consisting of Ni, Co, Fe, Ca, Al, B, and P as a component in the silicon to be contained in the electrode section.

According to a ninth aspect of the present invention, the honeycomb structure according to the above eighth aspect is provided, wherein the electrode section contains the at least one selected from the group as the component in the silicon at an atomic number ratio of 0.1 to 10 at % to an atomic number of the silicon.

According to a tenth aspect of the present invention, the honeycomb structure according to any one of the above first to ninth aspects is provided, wherein in the electrode section, the silicon is an n-type semiconductor.

According to an eleventh aspect of the present invention, the honeycomb structure according to any one of the above first to tenth aspects is provided, wherein a porosity of the electrode section is from 5 to 40%.

According to a twelfth aspect of the present invention, the honeycomb structure according to any one of the above first to eleventh aspects is provided, wherein a thickness of the electrode section is from 50 to 300 µm.

According to a thirteenth aspect of the present invention, the honeycomb structure according to any one of the above first to twelfth aspects is provided, further including: a surface coating layer disposed to cover at least part of the surface of the electrode section.

According to a fourteenth aspect of the present invention, the honeycomb structure according to the above thirteenth aspect is provided, wherein the surface coating layer is made of a material including at least one selected from the group consisting of silicon carbide, silicon nitride, mullite, and alumina.

According to a fifteenth aspect of the present invention, the honeycomb structure according to the above fourteenth aspect is provided, wherein the surface coating layer further contains an alkaline earth metal oxide, $Al_2O_3$, and $SiO_2$.

According to a sixteenth aspect of the present invention, the honeycomb structure according to any one of the above thirteenth to fifteenth aspects is provided, wherein a thickness of the surface coating layer is from 0.5 to 50 µm.

According to a seventh aspect of the present invention, a manufacturing method of a honeycomb structure including an electrode section forming step of applying an electrode section forming raw material to each of a first region and a second region of a side surface of a tubular honeycomb formed body having partition walls to define and form a plurality of cells as through channels of a fluid which extend from a first end surface as one end surface to a second end surface as the other end surface is provided, and an outer peripheral wall positioned on the outermost periphery, or a fired honeycomb body obtained by firing the honeycomb formed body, and drying and firing the applied electrode section forming raw material, to form a pair of electrode sections, wherein in the electrode section forming step, the electrode section forming raw material is applied so that in a cross section perpendicular to an extending direction of the cells of the honeycomb formed body or the fired honeycomb body, the first region is positioned on a side opposite to the second region via the center of the honeycomb formed body or the fired honeycomb body, the electrode section forming raw material includes silicon and an aggregate, and a ratio (the silicon/the aggregate) of a volume of the silicon to be included in the electrode section forming raw material to a volume of the aggregate to be included in the electrode section forming raw material is from 60/40 to 80/20.

According to an eighteenth aspect of the present invention, the manufacturing method of the honeycomb structure according to the above seventeenth aspect is provided, wherein as the silicon to be included in the electrode section forming raw material, silicon powder having an average particle diameter of 5 to 15 µm is used.

According to an nineteenth aspect of the present invention, the manufacturing method of the honeycomb structure according to the above seventeenth or eighteenth aspects is provided, wherein a content of silicon in the silicon powder is from 90.0 to 99.9 at %.

According to a twentieth aspect of the present invention, the manufacturing method of the honeycomb structure according to any one of the above seventeenth to nineteenth aspects is provided, wherein the electrode section forming raw material applied to the first region and the second region is dried, and then a surface coating layer forming raw material is applied to at least part of the surface of the electrode section forming raw material.

In a honeycomb structure of the present invention, electrode sections disposed on a side surface of a honeycomb structure body contain silicon and an aggregate, and a ratio (the silicon/the aggregate) of a volume of the silicon to be contained in the electrode sections to a volume of the aggregate to be contained in the electrode sections is from 60/40 to 80/20. According to this constitution, an electrical resistivity of the electrode sections can be lower than that of electrode sections of a conventional honeycomb structure. In consequence, a current supplied to one electrode section in the pair of electrode sections is suitably transmitted to the whole region of the electrode section, so that the current uniformly flows from the electrode section to the whole honeycomb structure body. Therefore, as compared with the conventional honeycomb structure which also functions as a heater, temperature unevenness during heat generation, i.e., heat generation unevenness can be decreased.

DETAILED DESCRIPTION OF THE INVENTION

Next, modes for carrying out the present invention will be described in detail with reference to the drawings. However, it should be understood that the present invention is not limited to the following embodiments and that design changes, improvements and the like are suitably added on the basis of ordinary knowledge of a person skilled in the art without departing from the gist of the present invention.

Figure 1:
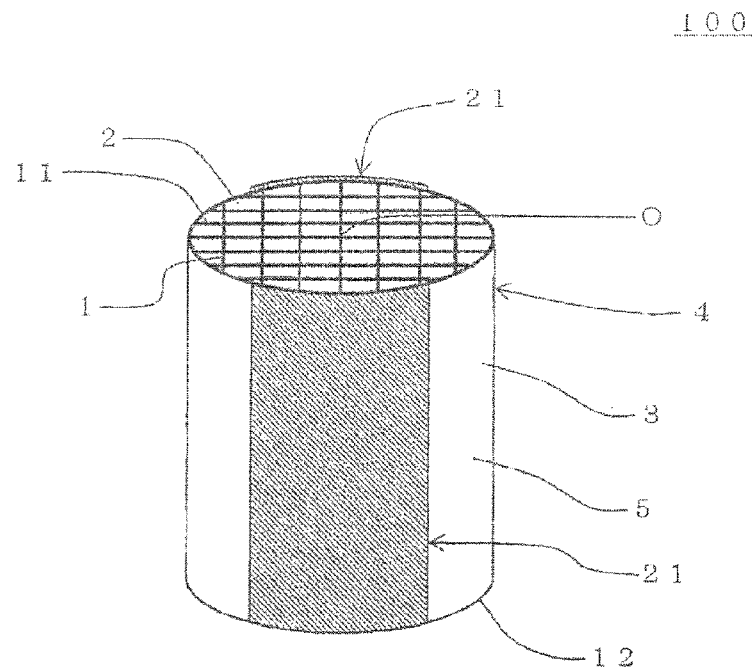
FIG. 1 is a perspective view schematically showing one embodiment of a honeycomb structure of the present invention.
Figure 2:
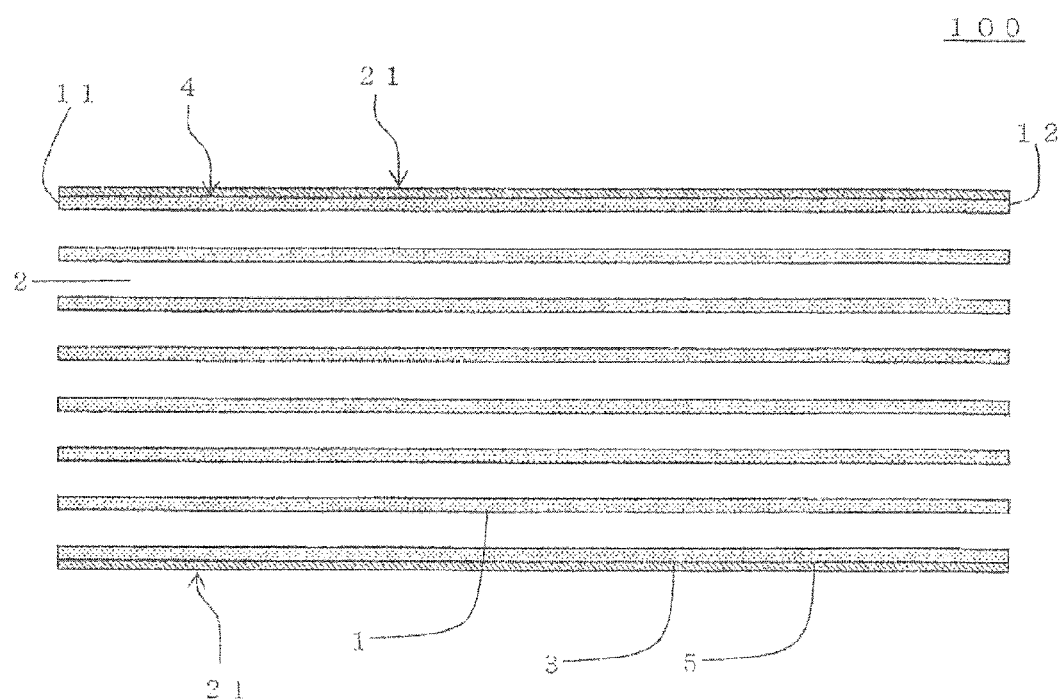
FIG. 2 is a schematic view showing a cross section parallel to a cell extending direction in the one embodiment of the honeycomb structure of the present invention.
Figure 3:
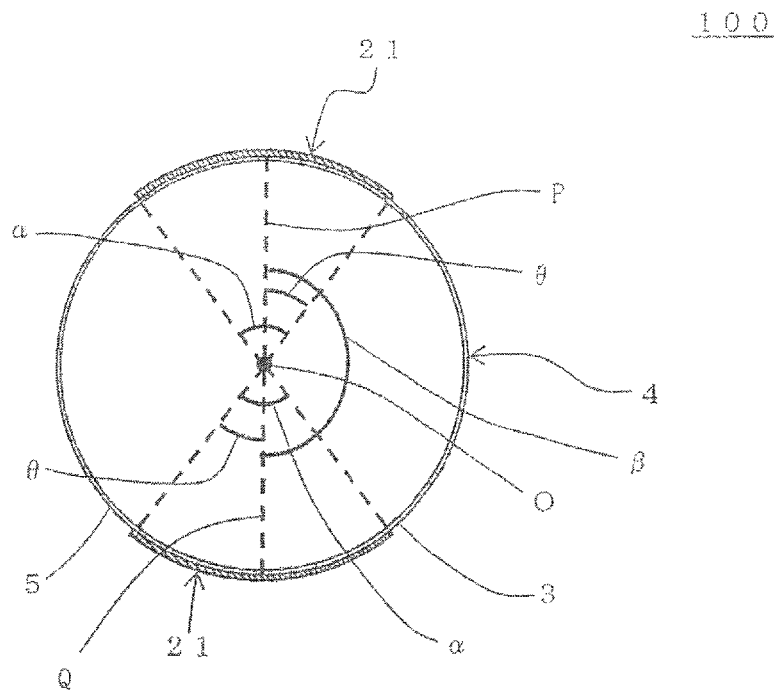
FIG. 3 is a schematic view showing a cross section perpendicular to the cell extending direction in the one embodiment of the honeycomb structure of the present invention.

(1) Honeycomb Structure:

As shown in FIG. 1 to FIG. 3, one embodiment of a honeycomb structure of the present invention is a honeycomb structure 100 including a tubular honeycomb structure body 4, and a pair of electrode sections 21 and 21 disposed on a side surface of the honeycomb structure body 4. The honeycomb structure body 4 has porous partition walls 1 to define and form a plurality of cells 2 as through channels of a fluid which extend from a first end surface 11 as one end surface to a second end surface 12 as the other end surface, and an outer peripheral wall 3 positioned on the outermost periphery. In the honeycomb structure 100 of the present embodiment, an electrical resistivity of the honeycomb structure body 4 is from 1 to 200 Ωcm. Moreover, each of the pair of electrode sections 21 and 21 is formed into a band shape extending in an extending direction of the cells 2 of the honeycomb structure section 4. Furthermore, in a cross section perpendicular to the extending direction of the cells 2, the one electrode section 21 in the pair of electrode sections 21 and 21 is disposed on a side opposite to the other electrode section 21 in the pair of electrode sections 21 and 21 via a center O of the honeycomb structure body 4. Additionally, the at least one electrode section 21 in the pair of electrode sections 21 and 21 contains silicon and an aggregate, and a ratio (the silicon/the aggregate) of a volume of the silicon to be contained in the electrode section 21 to a volume of the aggregate to be contained in the electrode section 21 is from 60/40 to 80/20. Hereinafter, "the ratio (the silicon/the aggregate) of the volume of the silicon to be contained in the electrode section to the volume of the aggregate to be contained in the electrode section" will simply be referred to as "the volume ratio of the silicon the aggregate" sometimes.

Hereinafter, in the present description, a percentage (vol %) of the volume of the aggregate in a total volume of the aggregate and silicon to be contained in the electrode section will be referred to as "the volume percentage (vol %) of the aggregate" sometimes. Moreover, a percentage (vol %) of the volume of the silicon in the total volume of the aggregate and the silicon to be contained in the electrode section will be referred to as "the volume percentage (vol %) of the silicon" sometimes. Therefore, when the volume ratio (the silicon/the aggregate) of the silicon to the aggregate is from 60/40 to 80/20, the volume percentage of the silicon is from 60 to 80 vol %, and the volume percentage of the aggregate is from 20 to 40 vol %.

Here, FIG. 1 is a perspective view schematically showing the one embodiment of the honeycomb structure of the present invention. FIG. 2 is a schematic view showing a cross section parallel to the cell extending direction in the one embodiment of the honeycomb structure of the present invention. FIG. 3 is a schematic view showing the cross section perpendicular to the cell extending direction in the one embodiment of the honeycomb structure of the present invention. It is to be noted that in FIG. 3, the partition walls are omitted.

In the honeycomb structure 100 of the present embodiment, the electrical resistivity of the honeycomb structure body 4 is from 1 to 200 Ωcm, and hence when a voltage is applied to the honeycomb structure body 4, the honeycomb structure body 4 generates heat. That is, even when a current is allowed to flow through the honeycomb structure body 4 by use of a power source having a high voltage, the current does not excessively flow through the honeycomb structure body 4, and the honeycomb structure can suitably be used as a heater. Furthermore, as described above, the pair of electrode sections 21 and 21 each formed into the band shape are disposed on the opposite sides via the center O of the honeycomb structure body 4. Therefore, it is possible to suppress a deviation of a temperature distribution of the honeycomb structure body 4 when the voltage is applied between the pair of electrode sections 21 and 21.

Furthermore, as described above, the electrode section 21 contains the silicon and the aggregate, and the volume ratio (the silicon/the aggregate) of the silicon to the aggregate is from 60/40 to 80/20. Therefore, the electrical resistivity of the electrode section 21 can be lower than that of an electrode section of a conventional honeycomb structure. In consequence, the current supplied to the electrode section 21 is suitably transmitted to the whole region of the electrode section 21, and hence the current evenly flows from the electrode section 21 to the whole honeycomb structure body 4. Therefore, as compared with the conventional honeycomb structure which also functions as the heater, temperature unevenness during heat generation, i.e., heat generation unevenness can be decreased. The silicon contained in the electrode section 21 is used as a binding agent which binds the aggregate. Moreover, the silicon usually has the electrical resistivity lower than that of the aggregate to be contained in the electrode section 21, and hence when the volume percentage of the silicon is from 60 to 80 vol %, the electrical resistivity of the electrode section lowers. In the honeycomb structure 100 of the present embodiment, the respective electrode sections 21 and 21 in the pair of electrode sections 21 and 21 contain the silicon and the aggregate, and the volume ratio (the silicon/the aggregate) of the silicon to the aggregate is preferably from 60/40 to 80/20. Furthermore, one of the electrode sections 21 in the pair of electrode sections 21 and 21 contains the silicon and the aggregate, and the volume ratio (the silicon/the aggregate) of the silicon to the aggregate may be 60/40 to 80/20. The volume ratio (the silicon/the aggregate) of the silicon to the aggregate of the electrode section 21 can be obtained by fitting, by a WPPD method, an XRD pattern measured by an X-ray diffraction method (XRD). In the above X-ray diffraction, a graphite monochrometer is used, and X-ray diffraction analysis is performed with a wavelength of a CuKα ray. A tube voltage is 50 kV, and a tube current is 300 mA. A continuous method is used, a measurement region is from 5 to 80°, a scanning speed is 2θ=2° min$^{-1}$, and a light receiving slit is set to 0.3 mm. It is to be noted that an example of a reference document in which the WPPD method is described is Reference Document 1 described in the following. Reference Document 1: Journal of the Ceramic Society of Japan 107 [3] 249 to 257 (1999). Furthermore, when the volume ratio of the silicon to the aggregate can be obtained in a raw material to prepare the electrode section 21 (i.e., an electrode section forming raw material), the volume ratio of the silicon to the aggregate may be measured in a stage of this electrode section forming raw material.

As the conventional honeycomb structure, for example, a honeycomb structure has been suggested in which a material of a pair of electrode sections is a composite material of silicon and silicon carbide, and a ratio of a mass between silicon and silicon carbide is from 20/80 to 50/50 (see the above-mentioned Patent Document 1). In such a conventional honeycomb structure, as to silicon to be contained in the electrode sections, a maximum value of a percentage of a volume of silicon is 58 vol % in terms of the percentage in a total volume of silicon and silicon carbide to be contained in the electrode sections. In the electrode sections of such a conventional honeycomb structure, an electrical resistivity of the electrode sections is high, and hence a current supplied to the electrode sections disadvantageously preferentially flows from a portion close to a position to which the current has been supplied to a honeycomb structure body sometimes, before the current is transmitted to all regions of the electrode sections. In the honeycomb structure of the present embodiment, the volume ratio (the silicon/the aggregate) of the silicon to the aggregate of the electrode section is from 60/40 to 80/20, and an electrical resistivity of the electrode section is lower than that of the electrode section of the conventional honeycomb structure.

The volume ratio (the silicon/the aggregate) of the silicon to the aggregate of the electrode section 21 is from 60/40 to 80/20, and hence the volume percentage of the silicon of the electrode section 21 is from 60 to 80 vol %, preferably from 65 to 80 vol %, and further preferably from 65 to 75 vol %. Furthermore, the volume percentage of the aggregate of the electrode section 21 is from 20 to 40 vol %, but is preferably from 20 to 35 vol %, and further preferably from 25 to 35 vol %. According to this constitution, deformation and the like of the electrode section can effectively be prevented, while lowering the electrical resistivity of the electrode section.

As shown in FIG. 1 to FIG. 3, in the honeycomb structure 100 of the present embodiment, the pair of electrode sections 21 and 21 are disposed on a side surface 5 of the honeycomb structure body 4 (the surface of the outer peripheral wall 3). In the honeycomb structure 100 of the present embodiment, when a voltage is applied between the pair of electrode sections 21 and 21, heat is generated. There is not any special restriction on the voltage to be applied, but the voltage is, for example, preferably from 12 to 900 V, and further preferably from 64 to 600 V.

Here, "in the cross section perpendicular to the extending direction of the cells 2, the one electrode section 21 in the pair of electrode sections 21 and 21 is disposed on the side opposite to the other electrode section 21 in the pair of electrode sections 21 and 21 via the center O of the honeycomb structure body 4" has a meaning as follows. First, in the above cross section, an angle formed by "a line segment P connecting a center point of the one electrode section 21 to the center O of the honeycomb structure body 4" and "a line segment Q connecting a center point of the other electrode section 21 to the center O of the honeycomb structure body 4" is an angle β. At this time, in the above meaning, the pair of electrode sections 21 and 21 are disposed in the honeycomb structure body 4 in such a positional relation that the angle β is in a range of 170° to 190° (see FIG. 3). "The center point of the one electrode section 21" is a point of the center in "a peripheral direction of the honeycomb structure body 4". Furthermore, "the center point of the other electrode section 21" is a point of the center in "the peripheral direction of the honeycomb structure body 4". Additionally, the angle β is an angle around the "the center O".

When the percentage of the volume of silicon in the electrode section is smaller than 60 vol %, an amount of silicon to be contained in the electrode section is smaller than that of the aggregate relatively, which heightens the electrical resistivity of the electrode section. The electrical resistivity of silicon is from about 0.01 to 0.1 Ωcm. When the amount of silicon is increased, the electrical resistivity of the electrode section thus lowers, but when the percentage of the volume of silicon is in excess of 80 vol %, the amount of the aggregate is excessively small, and hence a shape of the electrode section is not stabilized but is deformed. When the percentage of the volume of silicon is 80 vol % or less, the shape of the electrode section can be maintained. In the honeycomb structure of the present embodiment, the percentage of the volume of silicon in the electrode section is preferably from 60 to 80 vol %, further preferably from 65 to 80 vol %, and especially preferably from 65 to 75 vol %. When the percentage of the volume of silicon is in the above numeric value range, the shape of the electrode section is also stabilized, while lowering the electrical resistivity of the electrode section. When the percentage of the volume of silicon is large, silicon partially gathers in the electrode section, and silicon jets from the electrode section sometimes. However, when the percentage of the volume of silicon is 80 vol % or less, the aggregate is scattered in the electrode section, which can suppress such gathering of silicon as described above. Therefore, the shape of the electrode section can suitably be maintained. It is to be noted that the jetting of silicon from the electrode section preferably decreases.

In the honeycomb structure of the present embodiment, an average particle diameter of the aggregate to be contained in the electrode section is preferably from 0.1 to 50 μm, further preferably from 0.1 to 5 μm, and especially preferably from 0.5 to 5 μm. When the average particle diameter of the aggregate to be contained in the electrode section is smaller than 0.1 μm, the electrical resistivity of the electrode section tends to be high. Moreover, when the aggregate is made of a non-oxide such as silicon carbide and when the average particle diameter of the aggregate is smaller than 0.5 μm, the electrode section is easily oxidized under the usage environment of the honeycomb structure. Therefore, heat resisting properties of the electrode section deteriorate sometimes. When the aggregate is made of an oxide such as alumina and also when the average particle diameter of the aggregate is smaller than 0.5 μm, the electrode section is not easily oxidized, but thermal expansion of the electrode section increases sometimes. On the other hand, when the average particle diameter of the aggregate to be contained in the electrode section is in excess of 50 μm, the number of the particles of the aggregate to be contained in the electrode section relatively decreases. In consequence, silicon easily gathers in the electrode section, and silicon easily jets from the electrode section sometimes. Therefore, from the viewpoints that the jetting of silicon from the electrode section is suppressed and that the percentage of the volume of silicon is increased to lower the electrical resistivity of the electrode section, the average particle diameter of the aggregate is preferably small. The average particle diameter of the aggregate can be measured in a stage of the raw material by a laser diffraction method, but can also be measured in a stage after firing by the following method. The average particle diameter is a value of a cross section of the electrode section observed by an SEM and measured by image processing software. As the image processing software, Image Pro (manufactured by Nihon Visual Science Co., Ltd.) can be used. Specifically, for example, a sample for observing "the cross section" is first cut from the electrode section. As to the cross section of the electrode section, concaves and convexes of the cross section are filled with a resin, and polishing is further performed, to observe the polished surface. Then, an arithmetic mean of observation results of five view fields of "the cross section" is obtained as the average particle diameter of the aggregate to be contained in the electrode section. The above SEM observation of the cross section is performed at a magnification of 2000 times, and 20 maximum diameters of aggregate particles in an image of the cross section are measured at random. Additionally, average particle diameters of particles to be included in the electrode sections and the honeycomb structure body were values measured by a method similar to the above-mentioned measuring method of the average particle diameter of the aggregate to be contained in the electrode sections.

The aggregate to be contained in the electrode section preferably includes particles made of a material including at least one selected from the group consisting of silicon carbide, silicon nitride, mullite, and alumina. Such an aggregate is suitable from the viewpoints of the thermal expansion and the heat resisting properties. It is to be noted that when the aggregate is made of a material including two or more selected from the above-mentioned group, the aggregate may individually be made of the material including two or more selected from the group, or a plurality of types of aggregates made of the material each including at least one selected from the group may be contained in the electrode section.

The aggregate to be contained in the electrode section includes particles made of silicon carbide and particles made of mullite, and a ratio (the silicon carbide/the mullite) of a volume of the particles made of the silicon carbide to a volume of the particles made of the mullite is preferably from 20/80 to 80/20. It cannot easily be considered that silicon carbide has a sufficiently low electrical resistivity as a material for use in the electrode section, but it can be considered that the electrical resistivity is high as compared with the electrical resistivity of silicon as the binding agent. When the aggregate includes the particles made of silicon carbide and the particles made of mullite at the volume ratio in the above numeric value range, a porosity of the electrode section lowers, and the electrical resistivity thereof lowers. When the ratio of the volume of the particles made of silicon carbide is 80 vol % or less, the electrical resistivity of the electrode section can further lower. However, when the ratio of the volume of the particles made of mullite is excessively large, silicon easily jets from the electrode section sometimes. When the ratio of the volume of the particles made of mullite is 80 vol % or less, the deformation of the electrode section can suitably be suppressed. It is to be noted that the deformation of the electrode section indicates that a fluidity of silicon to be contained in the electrode section is excessively large, and hence a shape of the electrode section changes. The above-mentioned ratio of the volume of the particles made of silicon carbide to the volume of the particles made of mullite can be obtained by fitting, by the WPPD method, the XRD pattern measured by the X-ray diffraction method (XRD). The X-ray diffraction can be performed by a method similar to the X-ray diffraction in the volume ratio of silicon to the aggregate. Furthermore, when the ratio of the volume of the particles made of silicon carbide to the volume of the particles made of mullite can be obtained in the raw material to prepare the electrode sections (i.e., the electrode section forming raw material), the ratio may be measured in the stage of this electrode section forming raw material.

The electrode section may further contain an alkaline earth metal oxide, $Al_2O_3$, and $SiO_2$. According to this constitution, the porosity of the electrode section lowers, and the electrical resistivity of the electrode section further lowers. The electrode section further preferably contains the alkaline earth metal oxide, $Al_2O_3$, and $SiO_2$ as oxide particles containing these three components. Moreover, examples of the above-mentioned alkaline earth metal oxide include MgO and SrO. Above all, the alkaline earth metal oxide is further preferably MgO.

When the electrode section further contains the alkaline earth metal oxide, $Al_2O_3$, and $SiO_2$ and when the total volume of the silicon and the aggregate is 100 parts by volume, the electrode section more preferably contains from 2 to 10 parts by volume of the alkaline earth metal oxide, $Al_2O_3$, and $SiO_2$ total. With the result that the above oxide of the three components is contained in the above range of parts by volume, the electrical resistivity of the electrode section more suitably lowers. It is to be noted that when a content ratio of the oxide of the three components is in excess of 10 parts by volume, warp and the like easily occur in the electrode section sometimes. The content ratio of the above oxide of the three components can be obtained by observing the cross section of the electrode section by the SEM to analyze the image by the image processing software. As the image processing software, Image Pro (manufactured by Nihon Visual Science Co., Ltd.) can be used. Specifically, for example, the sample for observing "the cross section" is first cut from the electrode section. As to the cross section of the electrode section, the concaves and convexes of the cross section are filled with the resin, and the polishing is further performed, to observe the polished surface. Then, a total area of the alkaline earth metal oxide, $Al_2O_3$, and $SiO_2$ to a total area of the silicon and the aggregate is calculated from the observation results of the five view fields of "the cross section" (the magnification of 1000 times). Furthermore, when the above content ratio of the oxide of the three components can be obtained in the raw material for preparing the electrode sections (i.e., the electrode section forming raw material), the ratio may be measured in the stage of this electrode section forming raw material.

Moreover, the electrode section preferably contains at least one selected from the group consisting of Ni, C Fe, Ca, Al, B, and P as a component in the silicon to be contained in the electrode section. The components other than Si to be contained in silicon may be impurities other than a main component (i.e., Si), or a specific component may be added to silicon. For example, in silicon, at least one selected from the group consisting of Ni, Co, and Fe is contained as the component, which can lower the porosity of the electrode section. Furthermore, the electrode section more preferably contains the at least one selected from the above group as the component in the silicon at an atomic number ratio of 0.1 to 10.0 at % (an atomic percentage) to an atomic number of the silicon. When the ratio of the atomic number is in excess of 10.0 at %, the heat resisting properties of the electrode section deteriorate sometimes, and the thermal expansion of the electrode section is large sometimes. When the ratio of the atomic number is 0.1 at % or more, the electrical resistivity of the electrode section further lowers. The ratio of the atomic number of the above component to the atomic number of silicon can be obtained by measurement from the SEM image of the cross section by use of TOF-SIMS.

Furthermore, the electrode section may be an n-type semiconductor or a p-type semiconductor in which a predetermined additive is added to the silicon. For example, when at least one selected from the group consisting of Ni, Co, Fe, Ca, Al, B, and P is added as the component, the silicon of such a semiconductor can be obtained. In the electrode section, the silicon is preferably the n-type semiconductor. The electrode section containing the silicon of the n-type semiconductor can simply be manufactured, and characteristics of the electrode section are also good. Needless to say, in the electrode section, the silicon may be the p-type semiconductor. For example, when a small amount of boron (B) is added to the silicon, the silicon changes to the p-type semiconductor. As to whether the silicon changes to a n-type semiconductor or a p-type semiconductor can be obtained by measuring Hall effect of the electrode sections.

The porosity of the electrode section is preferably from 5 to 40%, further preferably from 5 to 30%, and especially preferably from 5 to 20%. The porosity of the electrode section is a value of the cross section of the electrode section observed by the SEM and measured by the image processing software. As the image processing software, Image Pro (manufactured by Nihon Visual Science Co., Ltd.) can be used. Specifically, for example, the sample for observing "the cross section" is first cut from the electrode section. As to the cross section of the electrode section, the concaves and convexes of the cross section are filled with the resin, and the polishing is further performed, to observe the polished surface. Then, a total area of pore portions to the whole is calculated from the observation results of two view fields of "the cross section" (a magnification of 500 times). When the porosity of the electrode section is in such a range, excellent heat shock resisting properties are obtained, and the electrical resistivity of the electrode section also lowers. When the porosity of the electrode section is smaller than 5%, a heat capacity of the electrode section is large, and the heat shock resisting properties deteriorate sometimes. When the porosity of the electrode section is in excess of 40%, the electrical resistivity of the electrode section does not easily lower.

A thickness of the electrode section is preferably from 50 to 300 µm, further preferably from 100 to 200 µm, and especially preferably from 100 to 150 µm. When the thickness of the electrode section is from 50 to 300 µm, the honeycomb structure body easily generates heat evenly, and the electrode sections obtain suitable heat shock resisting properties. For example, when the thickness of the electrode section is smaller than 50 µm, the electrode section is excessively thin, and hence the honeycomb structure body cannot easily generate the heat evenly. Furthermore, when the thickness of the electrode section is in excess of 300 µm, the heat shock resisting properties of the electrode section deteriorate sometimes. The thickness of the electrode section can be measured from an image obtained by photographing a cross section of the honeycomb structure which is vertical to the cell extending direction by the scanning electron microscope (SEM). The thickness of the electrode section is a value of an average thickness of three points of the electrode section in the peripheral direction, in "the center of the honeycomb structure in the cell extending direction". "The value of the average thickness of the three points of the electrode section in the peripheral direction" is a value obtained by the following method. First, the electrode section is divided into three equal portions "in the peripheral direction of the honeycomb structure body", to form three divided portions. That is, the electrode section is divided into the three equal portions by straight lines parallel to the cell extending direction, to form the three divided portions. Next, in each of the three divided portions, a thickness of the center in "the peripheral direction of the honeycomb structure body" is measured, and an average value of measurement results of the obtained thicknesses of the three points is obtained. The obtained average value is "the value of the average thickness of the three points of the electrode section in the peripheral direction".

An electrical resistivity of the electrode section 21 is preferably from 0.05 to 0.4 Ωcm, and further preferably from 0.05 to 0.3 Ωcm. When the electrical resistivity of the electrode section 21 is in such a range, each of the pair of electrode sections 21 and 21 effectively performs a function of an electrode. When the electrical resistivity of the electrode section 21 is smaller than 0.4 Ωcm, the current flows through the whole region of the electrode section 21, and the heat is easily evenly generated in the honeycomb structure body 4. When the electrical resistivity of the electrode section 21 is larger than 0.4 Ωcm, the current does not easily flow through the electrode section 21, and hence the function of the electrode is not easily be performed sometimes. The electrical resistivity of the electrode section is a value at room temperature.

Figure 4:
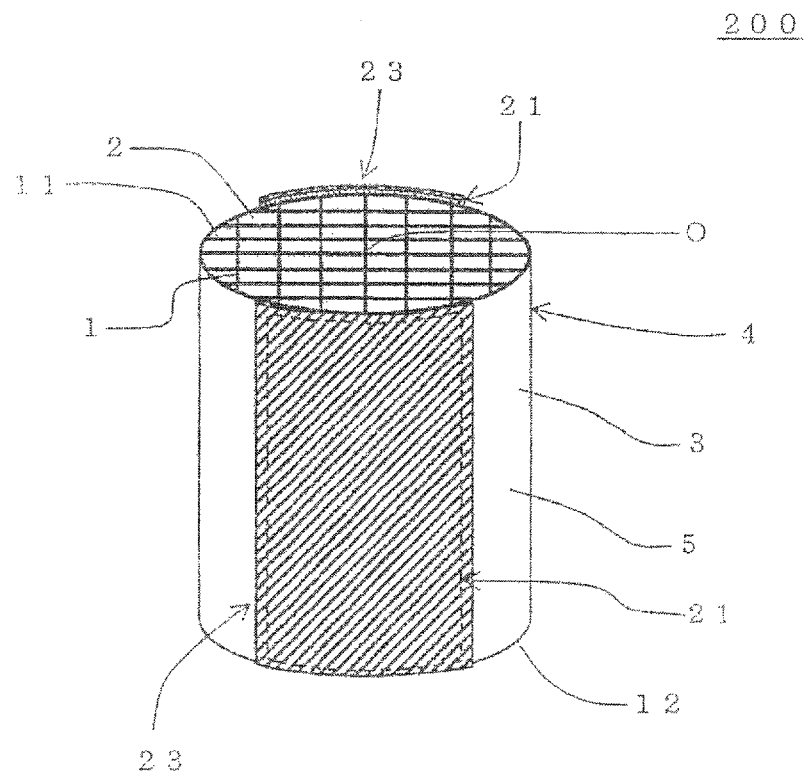
FIG. 4 is a perspective view schematically showing another embodiment of the honeycomb structure of the present invention.
Figure 5:
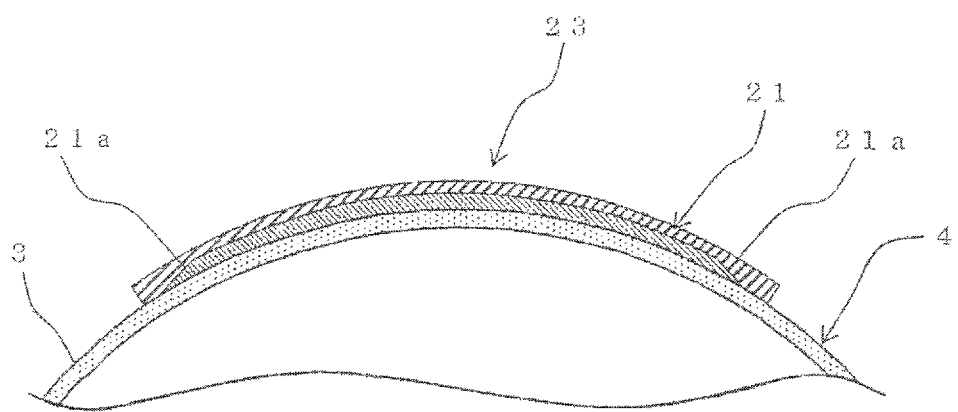
FIG. 5 is a schematic view showing enlarged part of a cross section perpendicular to a cell extending direction in the other embodiment of the honeycomb structure of the present invention.

Moreover, as shown in FIG. 4 and FIG. 5, the honeycomb structure may further include a surface coating layer 23 disposed to cover at least part of the surface of an electrode section 21. Here, FIG. 4 is a perspective view schematically showing another embodiment of the honeycomb structure of the present invention. FIG. 5 is a schematic view showing enlarged part of a cross section perpendicular to a cell extending direction in the other embodiment of the honeycomb structure of the present invention. The surface coating layer 23 is disposed on the surface of the electrode section 21 in this way, whereby the jetting of silicon from the surface of the electrode section 21 can be prevented. Therefore, a volume ratio of silicon in the electrode section 21 can be heightened, and an electrical resistivity of the electrode section 21 can suitably be decreased.

As to the surface coating layer 23, as long as the at least part of the surface of the electrode section 21 can be covered and the jetting of silicon from a portion where the surface coating layer 23 is disposed can be prevented, there is not any special restriction on a constitution of the surface coating layer. For example, the surface coating layer 23 may be disposed to cover the whole region of the surface of the electrode section 21, or may be disposed to partially cover part of the surface of the electrode section 21. From the viewpoint that the jetting of silicon from the whole region of the surface of the electrode section 21 can be suppressed, the surface coating layer 23 is preferably disposed to cover the whole region of the surface of the electrode section 21.

Furthermore, when the surface coating layer 23 is disposed, outer peripheral side end portions of the surface of the electrode section 21 may be cut, to dispose tilting portions 21a and 21a on an outer periphery of the surface of the electrode section 21 from the surface of the electrode section toward the surface which comes in contact with the honeycomb structure body. According to this constitution, the jetting of silicon from the outer peripheral side end portions of the electrode section 21 can effectively be prevented. A honeycomb structure 200 shown in FIG. 4 and FIG. 5 has a constitution similar to the honeycomb structure 100 shown in FIG. 1, except that the surface coating layers 23 and 23 are disposed on the surfaces of the pair of electrode sections 21 and 21, respectively, as hitherto described. Constitutional elements similar to those of the honeycomb structure 100 shown in FIG. 1 will be denoted with the same reference symbols, and the description thereof is omitted.

An example of the surface coating layer is a surface coating layer made of a material including at least one selected from the group consisting of silicon carbide, silicon nitride, mullite, and alumina. The surface coating layer having this constitution is suitable from the viewpoints of thermal expansion and heat resisting properties. Moreover, the surface coating layer may further contain an alkaline earth metal oxide, $Al_2O_3$, and $SiO_2$. According to this constitution, a porosity of the surface coating layer lowers, and the jetting of silicon from the electrode section does not easily occur. The surface coating layer more preferably contains the alkaline earth metal oxide, $Al_2O_3$, and $SiO_2$, as an oxide containing these three components. An example of the oxide containing the three components is cordierite.

A thickness of the surface coating layer is preferably from 0.5 to 50 μm, further preferably from 1 to 20 μm, and especially preferably from 1 to 10 μm. When the thickness of the surface coating layer is smaller than 0.5 μm, the surface coating layer is excessively thin, and the jetting of silicon cannot sufficiently be suppressed sometimes. Furthermore, when the thickness of the surface coating layer is in excess of 50 μm, heat shock resisting properties deteriorate sometimes.

As shown in FIG. 1 to FIG. 3, in the honeycomb structure 100 of the present embodiment, each of the pair of electrode sections 21 and 21 is formed into the band shape extending in the extending direction of the cells 2 of the honeycomb structure body 4. In the cross section perpendicular to the extending direction of the cells 2, an angle of 0.5 times a central angle α of each of the electrode sections 21 and 21 (an angle θ of 0.5 times the central angle α) is preferably from 15 to 65°, and further preferably from 30 to 60°. According to this constitution, it is possible to more effectively suppress the deviation of the current flowing through the honeycomb structure body 4, when the voltage is applied between the pair of electrode sections 21 and 21. That is, the current flowing through the honeycomb structure body 4 can flow more evenly. In consequence, it is possible to suppress the deviation of the heat generation in the honeycomb structure body 4. As shown in FIG. 3, "the central angle α of the electrode section 21" is an angle formed by two line segments connecting both ends of the electrode section 21 to the center O of the honeycomb structure body 4, in the cross section perpendicular to the extending direction of the cells 2. In other words, "the central angle α of the electrode section 21" is an inner angle of a portion of the center O, in a shape (e.g., a fan shape) formed by "the electrode section 21", "the line segment connecting one end portion of the electrode section 21 to the center O", and "the line segment connecting the other end portion of the electrode section 21 to the center O".

Moreover, "the angle θ of 0.5 times the central angle α" of the one electrode section 21 preferably has a size of 0.8 to 1.2 times, and further preferably has a size of 1.0 times (the same size) to "the angle θ of 0.5 times the central angle α" of the other electrode section 21. Consequently, when the voltage is applied between the pair of electrode sections 21 and 21, it is possible to more effectively suppress the deviation of the current flowing through the honeycomb structure body 4, whereby it is possible to more effectively suppress the deviation of the heat generation in the honeycomb structure body 4.

In the honeycomb structure 100 of the present embodiment, each of the pair of electrode sections 21 and 21 extends in the cell extending direction of the honeycomb structure body 4, and is formed into the band shape "extending between both the end portions". In this way, the pair of electrode sections 21 and 21 are disposed to extend between both the end portions of the honeycomb structure body 4, whereby when the voltage is applied between the pair of electrode sections 21 and 21, it is possible to more effectively suppress the deviation of the current flowing through the honeycomb structure body 4. Furthermore, it is accordingly possible to more effectively suppress the deviation of the heat generation in the honeycomb structure body 4. Here, when "the electrode section 21 is formed (disposed) to extend between both the end portions of the honeycomb structure body 4", the following state is meant. That is, it is meant that the one end portion of the electrode section 21 comes in contact with one end portion (one end surface) of the honeycomb structure body 4, and the other end portion of the electrode section 21 comes in contact with the other end portion (the other end surface) of the honeycomb structure body 4.

In the honeycomb structure 100 of the present embodiment, both the end portions of the electrode section 21 in "the extending direction of the cells 2 of the honeycomb structure body 4" do not come in contact with (do not reach) the first end surface 11 and the second end surface 12 of the honeycomb structure body 4 in another Preferable configuration. Moreover, the one end portion of the electrode section 21 comes in contact with (reaches), for example, the first end surface 11 of the honeycomb structure body 4, and the other end portion of the electrode section 21 does not come in contact with (does not reach) the second end surface 12 of the honeycomb structure body 4 in still another preferable configuration. In this way, in the structure where at least one end portion of the electrode section 21 does not come in contact with (does not reach) the first end surface 11 or the second end surface 12 of the honeycomb structure body 4, the heat shock resisting properties of the honeycomb structure can be enhanced. That is, each of the pair of electrode sections 21 and 21 preferably has the structure where at least one end portion does not come in contact with (does not reach) the first end surface 11 or the second end surface 12 of the honeycomb structure body 4, from the viewpoint that "the heat shock resisting properties of the honeycomb structure are enhanced". From the above, when importance is attached to the viewpoint that "the deviation of the current in the honeycomb structure body 4 is more effectively suppressed to more effectively suppress the deviation of the heat generation", the pair of electrode sections 21 and 21 are preferably formed to extend between both the end portions of the honeycomb structure body 4. On the other hand, when importance is attached to the viewpoint that "the heat shock resisting properties of the honeycomb structure are enhanced", at least one end portion of each of the pair of electrode sections 21 and 21 preferably does not come in contact with (does not reach) the first end surface 11 or the second end surface 12 of the honeycomb structure body 4.

In the honeycomb structure 100 shown in FIG. 1 to FIG. 3, the electrode section 21 has a shape obtained by bending a planar rectangular member along an outer periphery of a cylindrical shape. Here, when the bent electrode section 21 is deformed so that the section becomes a planar member which is not bent, the shape of the section will be referred to as "a planar shape" of the electrode section 21. "The planar shape" of the electrode section 21 shown in FIG. 1 to FIG. 3 is a rectangular shape. Furthermore, "an outer peripheral shape of the electrode section" means "the outer peripheral shape in the planar shape of the electrode section".

As shown in FIG. 1 to FIG. 3, the outer peripheral shape of the band-like electrode section 21 may be the rectangular shape, but the outer peripheral shape of the band-like electrode section 21 is "a shape in which corner portions of the rectangular shape are curvedly formed" in another preferable configuration. Furthermore, the outer peripheral shape of the band-like electrode section 21 is "a shape in which the corner portions of the rectangular shape are linearly chamfered" in still another configuration. A composite application of "a curved form" and "a linear form" is also preferable. The composite application of "the curved form" and "the linear form" means, for example, a shape in which at least one of corner portions has "a curvedly formed shape", and at least one of the corner portions has "a linearly chamfered shape", in the rectangular shape.

With the result that the outer peripheral shape of the electrode section 21 is "the shape in which the corner portions of the rectangular shape are curvedly formed" or "the shape in which the corner portions of the rectangular shape are linearly chamfered", the heat shock resisting properties of the honeycomb structure 100 can further be enhanced. When the corner portions of the electrode section 21 have right angles, stress in the vicinity of "each corner portion of the electrode section 21" in the honeycomb structure body 4 tends to be relatively high as compared with the other portions. In contrast, when the corner portion of the electrode section 21 is curvedly formed or linearly chamfered, it is possible to decrease the stress in the vicinity of "the corner portion of the electrode section 21" in the honeycomb structure body 4.

As to the honeycomb structure body 4 for use in the honeycomb structure 100 of the present embodiment, it is possible to use the honeycomb structure body 4 for use in a conventional honeycomb structure which is a catalyst carrier, and also functions as a heater when a voltage is applied thereto. Hereinafter, a constitution of the honeycomb structure body 4 will be described, but the honeycomb structure 100 of the present embodiment is not limited to the honeycomb structure body 4.

In the honeycomb structure 100 of the present embodiment, a material of the partition walls 1 and the outer peripheral wall 3 preferably contains a silicon-silicon carbide composite material or silicon carbide as a main component, and is further preferably the silicon-silicon carbide composite material or silicon carbide. When "the material of the partition walls 1 and the outer peripheral wall 3 contains silicon carbide particles and silicon as main components", it is meant that the partition walls 1 and the outer peripheral wall 3 contain 90 mass % or more of the silicon carbide particles and silicon (a total mass) in the whole material. By use of such a material, the electrical resistivity of the honeycomb structure body 4 can be from 1 to 200 Ωcm. Here, the silicon-silicon carbide composite material contains the silicon carbide particles as an aggregate, and silicon as a binding agent which binds the silicon carbide particles, and the plurality of silicon carbide particles are preferably bound by silicon so as to form pores among the silicon carbide particles. Furthermore, the silicon carbide is obtained by sintering silicon carbide. The electrical resistivity of the honeycomb structure body 4 is a value at 400° C.

In the honeycomb structure body 4, a thickness of the partition walls 1 is preferably from 50 to 200 μm, and further preferably from 70 to 130 μm. With the result that the thickness of the partition walls 1 is in such a range, it is possible to prevent a pressure loss during the flowing of an exhaust gas from being excessively large, even when the honeycomb structure 100 is used as the catalyst carrier and a catalyst is loaded thereonto. When the thickness of the partition walls 1 is smaller than 50 μm, a strength of the honeycomb structure 100 deteriorates sometimes. When the thickness of the partition walls 1 is larger than 200 μl and when the honeycomb structure 100 is used as the catalyst carrier and the catalyst is loaded thereonto, the pressure loss during the flowing of the exhaust gas is large sometimes.

In the honeycomb structure body 4, a cell density is preferably from 40 to 150 cells/cm$^2$, and further preferably from 70 to 100 cells/cm$^2$. With the result that the cell density is in such a range, in a state where the pressure loss during the flowing of the exhaust gas is small, a purification performance of the catalyst can be heightened. When the cell density is lower than 40 cells/cm$^2$, a catalyst loading area decreases sometimes. When the cell density is higher than 150 cells/cm$^2$, the pressure loss during the flowing of the exhaust gas is large sometimes, when the honeycomb structure 100 is used as the catalyst carrier and the catalyst is loaded thereonto.

An average particle diameter of the silicon carbide particles (the aggregate) constituting the honeycomb structure body 4 is preferably from 3 to 50 μm, and further preferably from 3 to 40 μm. With the result that the average particle diameter of the silicon carbide particles constituting the honeycomb structure body 4 is in such a range, the electrical resistivity of the honeycomb structure body 4 at 400° C. can be from 1 to 200 Ωcm. When the average particle diameter of the silicon carbide particles is smaller than 3 μm, the electrical resistivity of the honeycomb structure body 4 is large sometimes. When the average particle diameter of the silicon carbide particles is larger than 50 μm, the electrical resistivity of the honeycomb structure body 4 is small sometimes. Furthermore, when the average particle diameter of the silicon carbide particles is larger than 50 μm, a die for extrusion-forming is clogged with a forming raw material sometimes during the extrusion-forming of the honeycomb formed body.

The electrical resistivity of the honeycomb structure body 4 is from 1 to 200 Ωcm, and preferably from 10 to 100 Ωcm. When the electrical resistivity is smaller than 1 Ωcm and, for example, when the honeycomb structure 100 is energized by a power source of a high voltage of 200 V or more (the voltage is not limited to 200 V), the current excessively flows sometimes. When the electrical resistivity is larger than 200 Ωcm and, for example, when the honeycomb structure 100 is energized by the power source of the high voltage of 200 V or more (the voltage is not limited to 200 V), the current does not easily flow, and the heat is not sufficiently generated sometimes. The electrical resistivity of the honeycomb structure body 4 is a value measured by a four-terminals method.

The electrical resistivity of the electrode section 21 is preferably lower than the electrical resistivity of the honeycomb structure body 4. Furthermore, the electrical resistivity of the electrode section 21 is further preferably 20% or less, and especially preferably from 0.1 to 10% of the electrical resistivity of the honeycomb structure body 4. When the electrical resistivity of the electrode section 21 is 20% or less of the electrical resistivity of the honeycomb structure body 4, the electrode section 21 more effectively functions as the electrode.

When the material of the honeycomb structure section 4 is the silicon-silicon carbide composite material, the honeycomb structure body 4 preferably has the following constitution. A ratio of "a mass of silicon" to be contained in the honeycomb structure body 4 to a total of "a mass of the silicon carbide particles" to be contained in the honeycomb structure body 4 and "a mass of silicon" to be contained in the honeycomb structure body 4 is preferably from 10 to 40 mass %. When this ratio is lower than 10 mass %, the strength of the honeycomb structure deteriorates sometimes. When the ratio is higher than 40 mass %, the shape cannot be held during the firing. The ratio of "the mass of silicon" to be contained in the honeycomb structure body 4 to the total of "the mass of the silicon carbide particles" to be contained in the honeycomb structure body 4 and "the mass of silicon" to be contained in the honeycomb structure body 4 is further preferably from 15 to 35 mass %.

A porosity of the partition walls 1 of the honeycomb structure body 4 is preferably from 35 to 60%, and further preferably from 35 to 45%. When the porosity is smaller than 35%, the deformation during the firing is large sometimes. When the porosity is in excess of 60%, the strength of the honeycomb structure deteriorates sometimes. The porosity is a value measured by a mercury porosimeter.

An average pore diameter of the partition walls 1 of the honeycomb structure body 4 is preferably from 2 to 15 µm, and further preferably from 4 to 8 µm. When the average pore diameter is smaller than 2 µm, the electrical resistivity is excessively large sometimes. When the average pore diameter is larger than 15 µm, the electrical resistivity is excessively small sometimes. The average pore diameter is a value measured by the mercury porosimeter.

Moreover, a thickness of the outer peripheral wall 3 constituting the outermost periphery of the honeycomb structure body 4 is preferably from 0.1 to 2 mm. When the thickness is smaller than 0.1 mm, the strength of the honeycomb structure 100 deteriorates sometimes. When the thickness is larger than 2 mm, an area of the partition walls 1 onto which the catalyst is loaded is small sometimes.

In the honeycomb structure body 4, a shape of the cells 2 in the cross section perpendicular to the extending direction of the cells 2 is preferably a quadrangular shape, a hexagonal shape, an octagonal shape, or any combination of these shapes. As the shape of the cells 2, a square shape and the hexagonal shape are preferable. With such a cell shape, the pressure loss during the flowing of the exhaust gas through the honeycomb structure 100 is small, and the purification performance of the catalyst is excellent.

There is not any special restriction on the whole shape of the honeycomb structure body 4. Examples of the shape of the honeycomb structure body 4 include a tubular shape with a round bottom surface (a cylindrical shape), a tubular shape with an oval bottom surface, and a tubular shape with a bottom surface having a polygonal shape (a quadrangular shape, a pentangular shape, a hexagonal shape, a heptagonal shape, an octagonal shape, or the like). Moreover, as to a size of the honeycomb structure body 4, an area of the bottom surface is preferably from 2000 to 20000 mm$^2$, and further preferably from 4000 to 10000 mm$^2$.

Furthermore, a length of the honeycomb structure body 4 in a central axis direction is preferably from 50 to 200 mm, and further preferably from 75 to 150 mm.

An isostatic strength of the honeycomb structure 100 is preferably 1 MPa or more, and further preferably 3 MPa or more. The larger value of the isostatic strength is more preferable, but when a material, a structure and the like of the honeycomb structure 100 are taken into consideration, an upper limit of the isostatic strength is about 6 MPa. When the isostatic strength is smaller than 1 MPa, the honeycomb structure 100 easily breaks sometimes during use of the honeycomb structure as the catalyst carrier or the like. The isostatic strength is a value measured under a hydrostatic pressure in water.

The honeycomb structure 100 of the present embodiment, onto which the catalyst is loaded, is Preferably used as a catalyst body.

(2) Manufacturing Method of Honeycomb Structure:

Next, one embodiment of a manufacturing method of the honeycomb structure of the present invention will be described. The manufacturing method of the honeycomb structure of the present embodiment includes an electrode section forming step of forming a pair of electrode sections. In the electrode section forming step, an electrode section forming raw material is first applied to each of a first region and a second region of a side surface of a tubular honeycomb formed body, or a fired honeycomb body obtained by firing this honeycomb formed body. Next, the applied electrode section forming raw material is dried and fired, to form the pair of electrode sections. The tubular honeycomb formed body has partition walls to define and form a plurality of cells as through channels of a fluid which extend from a first end surface as one end surface to a second end surface as the other end surface, and an outer peripheral wall positioned on the outermost periphery. It is to be noted that a preparing method of the tubular honeycomb formed body will be described later.

In this electrode section forming step, the electrode section forming raw material is applied so that in a cross section perpendicular to an extending direction of the cells of the honeycomb formed body or the fired honeycomb body, the first region is positioned on a side opposite to the second region via the center of the honeycomb formed body or the fired honeycomb body. Moreover, in the manufacturing method of the honeycomb structure of the present embodiment, as the electrode section forming raw material, an electrode section forming raw material prepared as follows is used. That is, the electrode section forming raw material includes silicon and an aggregate, and a ratio (the silicon/the aggregate) of a volume of the silicon to be included in the electrode section forming raw material to a volume of the aggregate to be included in the electrode section forming raw material is from 60/40 to 80/20. The electrode section forming step is performed by using such an electrode section forming raw material, whereby the hitherto described honeycomb structure 100 shown in FIG. 1 to FIG. 3 can simply be manufactured.

The ratio (the silicon/the aggregate) of the volume of the silicon to be included in the electrode section forming raw material is preferably from 65/35 to 80/20, and further preferably from 65/35 to 75/25.

In the electrode section forming step, as silicon to be included in the electrode section forming raw material, silicon powder having an average particle diameter of 5 to 15 µm is preferably used. The silicon powder is molten during the firing of the electrode section forming raw material, to become a binding agent which binds aggregate particles with one another. When an average particle diameter of the silicon powder is smaller than 5 µm, silicon easily jets from the obtained electrode sections sometimes. Moreover, when the average particle diameter of the silicon powder is in excess of 15 µm, a porosity of the electrode sections is high, and an electrical resistivity of the electrode sections does not sufficiently lower sometimes. With the result that the silicon powder having an average particle diameter of 5 to 15 µm is used as silicon, silicon does not easily jet from the obtained electrode sections. Furthermore, the electrode sections have a low porosity (i.e., become dense), and the electrical resistivity of the electrode sections lowers. The average particle diameter of the silicon powder is further preferably from 5 to 10 µm. The average particle diameter of the silicon powder is a value measured by a laser diffraction method.

The silicon powder is preferably metal silicon powder. This metal silicon powder further preferably includes predetermined impurities as follows, except silicon (Si). Examples of the impurities include Fe, Al, Ca, B, and P. A content of silicon in the silicon powder is preferably from 90.0 to 99.9 at (an atomic percentage). When the content of silicon is smaller than 90.0 at %, the heat resisting properties of the electrode sections deteriorate sometimes, or the thermal expansion of the electrode sections is large sometimes. When the content of silicon is 99.9 at % or less, i.e., when more than 0.1 at % of the above-mentioned impurities are included, the electrical resistivity of the electrode sections further lowers.

Hereinafter, the manufacturing method of the honeycomb structure of the present embodiment will be described in more detail in accordance with a manufacturing method of the honeycomb structure shown in FIG. 1 to FIG. 3 as an example.

First, the honeycomb formed body is prepared by the following method. The silicon powder (silicon), a binder, a surfactant, a pore former, water and the like are added to silicon carbide powder (silicon carbide), to prepare a honeycomb forming raw material. A mass of silicon to a total of a mass of the silicon carbide powder and the mass of silicon is preferably from 10 to 40 mass %. An average particle diameter of silicon carbide particles in the silicon carbide powder is preferably from 3 to 50 µm, and further preferably from 3 to 40 µm. An average particle diameter of silicon (the silicon powder) is preferably from 2 to 35 µm. The average particle diameters of the silicon carbide particles and silicon (silicon particles) are values measured by a laser diffraction method. The silicon carbide particles are fine particles of silicon carbide constituting the silicon carbide powder, and the silicon particles are fine particles of silicon constituting the silicon powder. It is to be noted that this is a blend of the honeycomb forming raw material, when a material of the honeycomb structure body is a silicon-silicon carbide composite material. When the material of the honeycomb structure body is silicon carbide, silicon is not added.

Examples of the binder include methylcellulose, hydroxypropyl methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the binder is preferably from 2.0 to 10.0 parts by mass, when the total mass of the silicon carbide powder and the silicon powder is 100 parts by mass.

A content of the water is preferably from 20 to 60 parts by mass, when the total mass of the silicon carbide powder and the silicon powder is 100 parts by mass.

As the surfactant, ethylene glycol, dextrin, fatty acid soap, polyalcohol or the like can be used. One of these surfactants may be used alone, or any combination of two or more of the surfactants may be used. A content of the surfactant is preferably from 0.1 to 2.0 parts by mass, when the total mass of the silicon carbide powder and the silicon powder is 100 parts by mass.

As long as the pore former becomes pores after the firing, there is not any special restriction on the pore former, and examples of the pore former include graphite, starch, resin balloons, a water-absorbing resin, and silica gel. A content of the pore former is preferably from 0.5 to 10.0 parts by mass, when the total mass of the silicon carbide powder and the silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, a die is clogged with the pore former sometimes during formation. The average particle diameter of the pore former is a value measured by the laser diffraction method. When the pore former is the water-absorbing resin, the average particle diameter of the pore former is an average particle diameter after water absorption.

Next, the honeycomb forming raw material is kneaded to form a kneaded material. There is not any special restriction on a method of kneading the honeycomb forming raw material to form the kneaded material, and an example of the method is a method using a kneader, a vacuum clay kneader or the like.

Next, the honeycomb formed body is prepared by the extrusion-forming of the kneaded material. During the extrusion-forming, a die having a desirable whole shape, cell shape, partition wall thickness, cell density and the like is preferably used. As a material of the die, a cemented carbide which does not easily wear down is preferable. The honeycomb formed body has a structure having partition walls to define and form a plurality of cells as through channels of a fluid, and an outer peripheral wall positioned on the outermost periphery.

A partition wall thickness, a cell density, an outer peripheral wall thickness and the like of the honeycomb formed body can suitably be determined in accordance with a structure of the honeycomb structure of the present invention to be prepared, in consideration of shrinkage during the drying and the firing.

Next, the obtained honeycomb formed body is preferably dried. The honeycomb formed body after the drying will be referred to as "the dried honeycomb body" sometimes. There is not any special restriction on a drying method, but examples of the drying method include electromagnetic heating systems such as microwave heating drying and high frequency dielectric heating drying, and external hearing systems such as hot air drying, and superheat steam drying. Among these methods, it is preferable that a predetermined amount of a water content is dried by the electromagnetic heating system, and then the remaining water content is dried by the external heating system, because the whole formed body can rapidly and evenly be dried so that cracks are not generated. As drying conditions, 30 to 99 mass % of the water content is preferably removed from an amount of the water content prior to the drying by the electromagnetic heating system, and then the water content is preferably decreased to 3 mass % or less by the external heating system. As the electromagnetic heating system, the dielectric heating drying is preferable, and as the external heating system, the hot air drying is preferable.

When a length of the honeycomb formed body (the dried honeycomb body) in a central axis direction is not a desirable length, both end surfaces (both end portions) are preferably cut to obtain the desirable length. There is not any special restriction on a cutting method, but an example of the method is a method using a circular saw cutter or the like.

Next, the electrode section forming raw material to form the electrode sections is prepared. The electrode section forming raw material is preferably formed by adding predetermined additives to the aggregate and the silicon powder, followed by the kneading. As to the aggregate, it is possible to suitably use the aggregate made of various components which is the preferable example of the aggregate of the electrode sections in the honeycomb structure of the present embodiment. For example, as the aggregate, the silicon carbide powder, mullite powder, alumina powder, silicon nitride powder or the like can be used. Hereinafter, an example of a case where the silicon carbide powder is used as the aggregate will be described.

Specifically, the silicon powder, a binder, a moisture retaining agent, a dispersant, water and the like are added to the silicon carbide powder, followed by the kneading, to prepare the electrode section forming raw material. A ratio of a volume of the silicon powder to a volume of the silicon carbide powder as the aggregate is from 60/40 to 80/20.

Examples of the binder include methylcellulose, hydroxypropyl methylcellulose, hydroxypropoxyl cellulose, hydroxyethylcellulose, carboxymethylcellulose, and polyvinyl alcohol. Among these binders, methylcellulose and hydroxypropoxyl cellulose are preferable. A content of the binder is preferably from 0.1 to 5.0 parts by mass, when the total mass of the silicon carbide powder and the silicon powder is 100 parts by mass.

An example of the moisture retaining agent is glycerin. A content of the moisture retaining agent is preferably from 1 to 10 parts by mass, when the total mass of the silicon carbide powder and the silicon powder is 100 parts by mass.

As the dispersant, for example, as a surfactant, ethylene glycol, dextrin, fatty acid soap, polyalcohol or the like can be used. One of these surfactants may be used alone, or any combination of two or more of the surfactants may be used. A content of the surfactant is preferably from 0.1 to 2.0 parts by mass, when the total mass of the silicon carbide powder and the silicon powder is 100 parts by mass.

A content of the water is preferably from 15 to 60 parts by mass, when the total mass of the silicon carbide powder and the silicon powder is 100 parts by mass.

Moreover, to the electrode section forming raw material, there may further be added oxide particles containing three components of an alkaline earth metal oxide, $Al_2O_3$, and $SiO_2$. Examples of the alkaline earth metal oxide include MgO and SrO. An example of such oxide particles includes cordierite particles. A content of the oxide particles is more preferably from 2 to 10 parts by volume, when a total volume of the silicon carbide powder (the aggregate) and the silicon powder is 100 parts by volume.

Next, a mixture obtained by mixing the silicon carbide powder, the silicon powder, the binder, the moisture retaining agent, the dispersant, the water and the like is preferably kneaded, to obtain the paste-like electrode section forming raw material. There is not any special restriction on a kneading method, and, for example, a vertical stirrer can be used.

Next, the obtained electrode section forming raw material is preferably applied to the side surface of the dried honeycomb formed body (hereinafter, the dried honeycomb formed body will be referred to as "the dried honeycomb body" sometimes). There is not any special restriction on a method of applying the electrode section forming raw material to the side surface of the dried honeycomb body, but, for example, a printing method can be used. Furthermore, the electrode section forming raw material is preferably applied to the side surface of the dried honeycomb body, so as to obtain the shape of the electrode sections in the hitherto described honeycomb structure. That is, when regions to which the electrode section forming raw material is to be applied are a first region and a second region, the first region is positioned on a side opposite to the second region via the center of the dried honeycomb body, in a cross section perpendicular to an extending direction of cells of the dried honeycomb body. A thickness of the electrode section can be set to a desirable thickness by regulating a thickness of the electrode section forming raw material during the application thereof. The electrode sections can simply be formed by applying the electrode section forming raw material to the side surface of the dried honeycomb body, followed by the drying and the firing in this way, so that the electrode sections can very easily be formed. A firing step is only performed once, and hence the electrode section forming raw material is preferably applied to the side surface of the dried honeycomb formed body (the dried honeycomb body). However, the dried honeycomb formed body can be fired, to first prepare the fired honeycomb body, and then the electrode section forming raw material can be applied to the side surface of this fired honeycomb body.

Next, the electrode section forming raw material applied to the side surface of the dried honeycomb body is preferably dried, to prepare "the dried honeycomb body with the electrode section forming raw material". Drying conditions are preferably from 50 to 100° C.

Next, the dried honeycomb body with the electrode section forming raw material is preferably fired to prepare the honeycomb structure. It is to be noted that the binder and the like are removed prior to the firing, and hence calcinating is preferably performed. The calcinating is preferably performed at 400 to 500° C. in the air atmosphere for 0.5 to 20 hours.

As firing conditions, heating is preferably performed at 1400 to 1500° C. in an inert atmosphere of argon or the like for one to 20 hours. Moreover, after the firing, an oxygenation treatment is preferably performed at 1200 to 1350° C. for one to ten hours for the purpose of enhancement of durability. There is not any special restriction on calcinating and firing methods, and the firing can be performed by using an electric furnace, a gas furnace or the like.

As described above, the honeycomb structure 100 shown in FIG. 1 to FIG. 3 can be manufactured. Furthermore, as shown in FIG. 4, when the surface coating layer 23 is disposed to cover the surface of the electrode section 21, the surface coating layer forming raw material is preferably prepared, and the surface coating layer forming raw material is preferably applied to the surfaces of the electrode sections, to prepare the surface coating layers.

The surface coating layer forming raw material is prepared by adding a binder, a moisture retaining agent, a dispersant, water and the like to coating layer powder for forming the surface coating layer, followed by the kneading. An example of the coating layer powder is powder made of a material including at least one selected from the group consisting of silicon carbide, silicon nitride, mullite, and alumina. Moreover, to the surface coating layer forming raw material, there may further be added oxide particles containing three components of an alkaline earth metal oxide, $Al_2O_3$, and $SiO_2$. Examples of the alkaline earth metal oxide include MgO and SrO. Examples of the oxide particles include cordierite particles. The surface coating layer forming raw material is preferably applied to the surface of this "dried electrode section forming raw material" in a stage where the electrode section forming raw material applied to the side surface of the dried honeycomb body is dried. That is, prior to the firing of "the dried honeycomb body with the electrode section forming raw material", the surface coating layer forming raw material is preferably applied. Then, the surface coating layer forming raw material is preferably dried, followed by the firing. According to this constitution, the electrode sections and the surface coating layers can very easily be formed.

Moreover, the surface coating layer may be formed by using carbon spray. That is, the above-mentioned surface coating layer forming raw material is not prepared, but spray (the carbon spray) in which nano particles of carbon and the like are contained may be applied to the surface of the electrode section forming raw material applied to the side surface of the dried honeycomb body, to form the surface coating layer.

EXAMPLES

Hereinafter, the present invention will further specifically be described with respect to examples, but the present invention is not limited to these examples.

Example 1

Silicon powder, silicon carbide powder, cordierite powder as oxide particles, methylcellulose, glycerin, a polyacrylic dispersant and water were mixed by a rotation and revolution type stirrer, to prepare an electrode section forming raw material.

As the silicon powder, 52 g of silicon powder having an average particle diameter of 5 μm and a density of 2.33 g/cm$^3$ was used. As the silicon carbide powder, 48 g of silicon carbide powder having an average particle diameter of 3 μm and a density of 3.17 g/cm$^3$ was used. As the cordierite powder, 5.0 g of cordierite powder having an average particle diameter of 2 μm and a density of 2.65 g/cm$^3$ was used. Furthermore, an amount of methylcellulose to be used was 0.8 g, an amount of glycerin to be used was 9 g, and an amount of the polyacrylic dispersant to be used was 0.1 g. Furthermore, an amount of the water as a dispersion medium to be used was 40 g.

Furthermore, a honeycomb forming raw material for preparing a honeycomb structure section was prepared. The honeycomb forming raw material was prepared by mixing 6 kg of silicon powder of 14 kg of silicon carbide powder of 30 μm, 1 kg of cordierite powder, 1.6 kg of methylcellulose, and 8 kg of water, followed by kneading with a kneader.

Next, the obtained honeycomb forming raw material was vacuum-kneaded to obtain a kneaded material, and the obtained kneaded material was extruded into a honeycomb form, to obtain a honeycomb formed body. Next, the obtained honeycomb formed body was dried at 120° C., to obtain a dried honeycomb body. Next, the electrode section forming raw material prepared in advance was applied to the side surface of the obtained dried honeycomb body, and dried at 80° C., to obtain the dried honeycomb body with the electrode section forming raw material. The dried honeycomb body with the electrode section forming raw material was degreased, fired, and subjected to an oxygenation treatment, to prepare a honeycomb structure. The degreasing was performed at 450° C. in the atmospheric air for five hours. The firing was performed at 1450° C. in an argon atmosphere for two hours. The oxygenation treatment was performed at 1200° C. in the atmospheric air for five hours.

In the honeycomb structure body of the obtained honeycomb structure, a thickness of partition walls was 101.6 μm, and a cell density was 93 cells/cm$^2$. Furthermore, a diameter of each end surface of the honeycomb structure body was 100 mm, and a length in a cell extending direction was 100 mm.

In "a particle diameter (μm)" column of silicon of Table 1, an average particle diameter of silicon powder is shown. In "vol %" column of silicon of Table 1, a percentage (vol %) of a volume of the silicon powder in a total volume of the silicon powder and an aggregate is shown. Moreover, in "a type" column of the aggregate of Table 1, a component of the aggregate is shown. In "a particle diameter (μm)" column of the aggregate of Table 1, an average particle diameter of the aggregate is shown. In "vol %" column of the aggregate of Table 1, a percentage (vol %) of a volume of the aggregate in the total volume of the silicon powder and the aggregate is shown. In "a type" column of an oxide of Table 1, a type of oxide particles contained in an electrode section forming raw material is shown. It is to be noted that an oxide A in Table 1 is "MgO—Al$_2$O$_3$—SiO$_2$". That is, it is described that this oxide A is cordierite containing three components of MgO, Al$_2$O$_3$, and SiO$_2$. In "parts by volume" column of the oxide of Table 1, there is shown a content ratio (parts by volume) when the total volume of the silicon powder and the aggregate is 100 parts by volume.

TABLE 1

| | Silicon | | Aggregate | | | Oxide | | Others | | Surface coat | |
|---|---|---|---|---|---|---|---|---|---|---|---|
| | Particle dia. (μm) | Vol % | Type | Particle dia. (μm) | Vol % | Type | Parts by volume | Type | at % | Type | Thickness (μm) |
| Example 1 | 5 | 60 | SiC | 3 | 40 | Oxide A | 5 | — | | — | |
| Example 2 | 5 | 65 | SiC | 3 | 35 | Oxide A | 5 | — | | — | |
| Example 3 | 2 | 65 | SiC | 3 | 35 | Oxide A | 5 | — | | — | |
| Example 4 | 5 | 70 | SiC | 3 | 30 | Oxide A | 5 | — | | — | |
| Example 5 | 12 | 70 | SiC | 3 | 30 | Oxide A | 5 | — | | — | |
| Example 6 | 46 | 70 | SiC | 3 | 30 | Oxide A | 5 | — | | — | |

*1: The oxide A is MgO—Al$_2$O$_3$—SiO$_2$.

Example 2

The procedures of Example 1 were repeated except that as an electrode section forming raw material, 58 g of silicon powder of 5 μm, 42 g of silicon carbide powder of 3 μm and 5.0 g of cordierite powder of 2 μm were used, to prepare a honeycomb structure. Densities of the silicon powder, the silicon carbide powder and the cordierite powder were the same values as in Example 1.

Example 3

The procedures of Example 1 were repeated except that as an electrode section forming raw material, 58 g of silicon powder of 2 μm, 42 g of silicon carbide powder of 3 μm and 5.0 g of cordierite powder of 2 μm were used, to prepare a honeycomb structure. Densities of the silicon powder, the silicon carbide powder and the cordierite powder were the same values as in Example 1.

Example 4

The procedures of Example 1 were repeated except that as an electrode section forming raw material, 63 g of silicon powder of 5 μm, 37 g of silicon carbide powder of 3 μm and 5.1 g of cordierite powder of 2 μm were used, to prepare a honeycomb structure. Densities of the silicon powder, the silicon carbide powder and the cordierite powder were the same values as in Example 1.

Example 5

The procedures of Example 1 were repeated except that as an electrode section forming raw material, 63 g of silicon powder of 12 μm, 37 g of silicon carbide powder of 3 μm and 5.1 g of cordierite powder of 2 μm were used, to prepare a honeycomb structure. Densities of the silicon powder, the silicon carbide powder and the cordierite powder were the same values as in Example 1.

Example 6

The procedures of Example 1 were repeated except that as an electrode section forming raw material, 63 g of silicon powder of 46 μm, 37 g of silicon carbide powder of 3 μm and 5.1 g of cordierite powder of 2 μm were used, to prepare a honeycomb structure. Densities of the silicon powder, the silicon carbide powder and the cordierite powder were the same values as in Example 1. In Table 1, there are shown constitutions of the silicon powder, an aggregate (the silicon carbide powder), and an oxide used in Examples 2 to 6.

Example 7

The procedures of Example 1 were repeated except that 64 g of silicon powder of 5 μm, 36 g of mullite powder of 2 μm (a density of 3.03 g/cm$^3$), and 5.2 g of cordierite powder of 2 μm were used, to prepare an electrode section forming raw material. Densities of the silicon powder, and the cordierite powder were the same values as in Example 1.

In Example 7, the electrode section forming raw material was applied to a dried honeycomb body, the electrode section forming raw material was dried, and then end portions of the electrode section forming raw material were cut, and tilted. Afterward, a surface coating layer forming raw material was applied to cover the electrode section forming raw material. The dried honeycomb body to which the surface coating layer forming raw material was applied was degreased, fired, and subjected to an oxygenation treatment, to prepare a honeycomb structure. The surface coating layer forming raw material became a surface coating layer through the degreasing, the firing and the oxygenation treatment. As the surface coating layer forming raw material, there was used a slurry obtained by mixing 10 g of mullite powder of 2 μm (a density of 3.03 g/cm$^3$), 1 g of cordierite powder of 2 μm (a density of 2.65 g/cm$^3$), 50 g of water, and 0.1 g of a polyacrylic dispersant.

Example 8

The procedures of Example 7 were repeated except that as an electrode section forming raw material, 70 g of silicon powder of 5 μm, 30 g of mullite powder of 2 μm (a density of 3.03 g/cm$^3$) and 5.3 g of cordierite powder of 2 μm were used, to prepare a honeycomb structure. Densities of the silicon powder and the cordierite powder were the same values as in Example 1.

Example 9

The procedures of Example 7 were repeated except that as an electrode section forming raw material, 75 g of silicon powder of 5 μm, 25 g of mullite powder of 2 μm (a density of 3.03 g/cm$^3$) and 5.4 g of cordierite powder of 2 μm were used, to prepare a honeycomb structure. Densities of the silicon powder and the cordierite powder were the same values as in Example 1.

Example 10

The procedures of Example 1 were repeated except that 69 g of silicon powder of 5 μm, 31 g of silicon carbide powder of 3 μm, 2.1 g of cordierite powder of 2 μm and 7.3 g of Ni powder of 0.8 μm (a density of 8.91 g/cm$^3$) were used, to prepare an electrode section forming raw material. Densities of the silicon powder, the silicon carbide powder and the cordierite powder were the same values as in Example 1.

In Example 10, the electrode section forming raw material was applied to a dried honeycomb body, the electrode section forming raw material was dried, and then end portions of the electrode section forming raw material were cut, and tilted. Afterward, a surface coating layer forming raw material was applied to cover the electrode section forming raw material. As the surface coating layer forming raw material, carbon spray was used.

Example 11

The procedures of Example 1 were repeated except that 70 g of silicon powder of 5 μm, 30 g of mullite powder of 2 μm (a density of 3.03 g/cm$^3$) and 5.3 g of cordierite powder of 2 μm were used, to prepare an electrode section forming raw material. Densities of the silicon powder and the cordierite powder were the same values as in Example 1.

In Example 11, the electrode section forming raw material was applied to a dried honeycomb body, the electrode section forming raw material was dried, and then end portions of the electrode section forming raw material were cut, and tilted. Afterward, a surface coating layer forming raw material was applied to cover the electrode section forming raw material. As the surface coating layer forming raw material, there was used a slurry obtained by mixing 10 g of silicon carbide powder of 3 μm (a density of 3.17 g/cm$^3$), 1 g of cordierite powder of 2 μm (a density of 2.65 g/cm$^3$), 50 g of water, and 0.1 g of a polyacrylic dispersant.

Example 12

The procedures of Example 1 were repeated except that as an electrode section forming raw material, 58 g of silicon powder of 5 μm and 42 g of silicon carbide powder of 3 μm were used, to prepare a honeycomb structure. Densities of the silicon powder and the silicon carbide powder were the same values as in Example 1.

Example 13

The procedures of Example 1 were repeated except that as an electrode section forming raw material, 58 g of silicon powder of 5 μm, 42 g of silicon carbide powder of 3 μm and 2.0 g of cordierite powder of 2 μm were used, to prepare a honeycomb structure. Densities of the silicon powder, the silicon carbide powder and the cordierite powder were the same values as in Example 1.

Example 14

The procedures of Example 1 were repeated except that as an electrode section forming raw material, 58 g of silicon powder of 5 μm, 42 g of silicon carbide powder of 3 μm and 10 g of cordierite powder of 2 μm were used, to prepare a honeycomb structure. Densities of the silicon powder, the silicon carbide powder and the cordierite powder were the same values as in Example 1.

Example 15

The procedures of Example 1 were repeated except that as an electrode section forming raw material, 58 g of silicon powder of 5 μm, 42 g of silicon carbide powder of 3 μm and 15 g of cordierite powder of 2 μm were used, to prepare a honeycomb structure. Densities of the silicon powder, the silicon carbide powder and the cordierite powder were the same values as in Example 1.

Example 16

The procedures of Example 1 were repeated except that as an electrode section forming raw material, the following raw materials were used, to prepare a honeycomb structure. There were used 58 g of silicon powder of 5 μm, 42 g of silicon carbide powder of 3 μm, 1.1 g of $SrCO_3$ powder of 1 μm, 0.5 g of $Al(OH)_3$ powder of 3 μm, and 2.6 g of silica sol in which a solid content was 40%. Densities of the silicon powder and the silicon carbide powder were the same values as in Example 1. Additionally, a density of fired $SrO-Al_2O_3-SiO_2$ was 2.83 g/cm³.

Example 17

The procedures of Example 1 were repeated except that as an electrode section forming raw material, 58 g of silicon powder of 5 μm, 42 g of silicon carbide powder of 3 μm, 5.0 g of cordierite powder of 2 μm and 6.1 g of Ni powder of 0.8 μm were used, to prepare a honeycomb structure. Densities of the silicon powder, the silicon carbide powder and the cordierite powder were the same values as in Example 1. A density of the Ni powder was 8.91 g/cm³.

Example 18

The procedures of Example 1 were repeated except that as an electrode section forming raw material, 58 g of silicon powder of 5 μm, 42 g of silicon carbide powder of 3 μm, 5.0 g of cordierite powder of 2 μm and 12.3 g of Ni powder of 0.8 μm were used, to prepare a honeycomb structure. Densities of the silicon powder, the silicon carbide powder and the cordierite powder were the same values as in Example 1. A density of the Ni powder was the same value as in Example 17.

Example 19

The procedures of Example 1 were repeated except that as an electrode section forming raw material, 58 g of silicon powder of 5 μm, 42 g of silicon carbide powder of 3 μm, 5.0 g of cordierite powder of 2 μm and 9.5 g of $Co(OH)_2$ powder of 0.4 μm were used, to prepare a honeycomb structure. Densities of the silicon powder, the silicon carbide powder and the cordierite powder were the same values as in Example 1. A density of the $Co(OH)_2$ powder was 3.6 g/cm³.

Example 20

The procedures of Example 1 were repeated except that as an electrode section forming raw material, 58 g of silicon powder of 5 μm, 42 g of silicon carbide powder of 3 μm, 5.0 g of cordierite powder of 2 μm and 8.2 g of $Fe_2O_3$ powder of 0.6 μm were used, to prepare a honeycomb structure. Densities of the silicon powder, the silicon carbide powder and the cordierite powder were the same values as in Example 1. A density of the $Fe_2O_3$ powder was 5.24 g/cm³.

Example 21

The procedures of Example 1 were repeated except that as an electrode section forming raw material, 58 g of silicon powder of 5 μm, 42 g of silicon carbide powder of 3 μm, 5.0 g of cordierite powder of 2 μm and 0.1 g of metal boron powder of 20 μm were used, to prepare a honeycomb structure. Densities of the silicon powder, the silicon carbide powder and the cordierite powder were the same values as in Example 1. A density of the metal boron powder was 2.08 g/cm³. Here, in Table 2, there are shown constitutions of silicon powder, an aggregate, and an oxide used in Examples 7 to 21. It is to be noted that an oxide B in Table 2 is "$SrO-Al_2O_3-SiO_2$". Moreover, as to Examples 10 and 17 to 21, in "a type" column of others of Table 2, a type of another component contained in the electrode section forming raw material is shown. Furthermore, as to Examples 10 and 17 to 21, in "at %" column of the others of Table 2, a ratio (at %) of an atomic number of the other component to an atomic number of silicon is shown. Additionally, as to Examples 7 to 11, in "a type" column of surface coat of Table 2, a type of a surface coating layer is shown. As to Examples 7 to 11, in "a thickness (μm)" column of the surface coat of Table 2, a thickness of the surface coating layer is shown.

TABLE 2

|  | Silicon | | Aggregate | | | Oxide | | | | Surface coat | |
|---|---|---|---|---|---|---|---|---|---|---|---|
|  | Particle | | | Particle | | | Parts by | Others | | | Thickness |
|  | dia. (μm) | Vol % | Type | dia. (μm) | Vol % | Type | volume | Type | at % | Type | (μm) |
| Example 7 | 5 | 70 | Mullite | 2 | 30 | Oxide A | 5 | — | | Mullite/cordierite | 5 |
| Example 8 | 5 | 75 | Mullite | 2 | 25 | Oxide A | 5 | — | | Mullite/cordierite | 5 |
| Example 9 | 5 | 80 | Mullite | 2 | 20 | Oxide A | 5 | — | | Mullite/cordierite | 5 |
| Example 10 | 5 | 75 | SiC | 3 | 25 | Oxide A | 2 | Ni | 5 | SiC | 1 |
| Example 11 | 5 | 75 | Mullite | 2 | 25 | Oxide A | 5 | — | | SiC/cordierite | 10 |
| Example 12 | 5 | 65 | SiC | 3 | 35 | — | | — | | — | |
| Example 13 | 5 | 65 | SiC | 3 | 35 | Oxide A | 2 | — | | — | |
| Example 14 | 5 | 65 | SiC | 3 | 35 | Oxide A | 10 | — | | — | |
| Example 15 | 5 | 65 | SiC | 3 | 35 | Oxide A | 15 | — | | — | |
| Example 16 | 5 | 65 | SiC | 3 | 35 | Oxide B | 2 | — | | — | |
| Example 17 | 5 | 65 | SiC | 3 | 35 | Oxide A | 5 | Ni | 5 | — | |
| Example 18 | 5 | 65 | SiC | 3 | 35 | Oxide A | 5 | Ni | 10 | — | |
| Example 19 | 5 | 65 | SiC | 3 | 35 | Oxide A | 5 | Co | 5 | — | |
| Example 20 | 5 | 65 | SiC | 3 | 35 | Oxide A | 5 | Fe | 5 | — | |
| Example 21 | 5 | 65 | SiC | 3 | 35 | Oxide A | 5 | B | 0.5 | — | |

*1: The oxide A is $MgO-Al_2O_3-SiO_2$.
*2: The oxide B is $SrO-Al_2O_3-SiO_2$.

Example 22

The procedures of Example 1 were repeated except that as an electrode section forming raw material, 58 g of silicon powder of 5 μm, 34 g of silicon carbide powder of 3 μm, 8 g of mullite powder of 2 μm and 5.1 g of cordierite powder of 2 μm were used, to prepare a honeycomb structure. Densities of the silicon powder, the silicon carbide powder and the cordierite powder were the same values as in Example 1. A density of the mullite powder was 3.03 g/cm³.

Example 23

The procedures of Example 1 were repeated except that as an electrode section forming raw material, 58 g of silicon powder of 5 μm, 21 g of silicon carbide powder of 3 μm, 20 g of mullite powder of 2 μm and 5.1 g of cordierite powder of 2 μm were used, to prepare a honeycomb structure. Densities of the silicon powder, the silicon carbide powder and the cordierite powder were the same values as in Example 1. A density of the mullite powder was the same value as in Example 22.

Example 24

The procedures of Example 1 were repeated except that as an electrode section forming raw material, 59 g of silicon powder of 5 μm, 9 g of silicon carbide powder of 3 μm, 33 g of mullite powder of 2 μm and 5.1 g of cordierite powder of 2 μm were used, to prepare a honeycomb structure. Densities of the silicon powder, the silicon carbide powder, and the cordierite powder were the same values as in Example 1. A density of the mullite powder was the same as in Example 22.

Example 25

The procedures of Example 1 were repeated except that as an electrode section forming raw material, 59 g of silicon powder of 5 μm, 41 g of mullite powder of 2 μm and 5.1 g of cordierite powder of 2 μm were used, to prepare a honeycomb structure. Densities of the silicon powder and the cordierite powder were the same values as in Example 1. A density of the mullite powder was the same value as in Example 22.

Example 26

The procedures of Example 1 were repeated except that as an electrode section forming raw material, 62 g of silicon powder of 5 μm, 29 g of silicon carbide powder of 3 μm, 9 g of alumina powder of 0.2 μm and 5.0 g of cordierite powder of 2 μm were used, to prepare a honeycomb structure. Densities of the silicon powder, the silicon carbide powder and the cordierite powder were the same values as in Example 1. A density of the alumina powder was 3.97 g/cm³.

Example 27

The procedures of Example 1 were repeated except that as an electrode section forming raw material, 64 g of silicon powder of 5 μm, 8 g of $Si_3N_4$ powder of 0.6 μm, 28 g of mullite powder of 2 μm and 5.2 g of cordierite powder of 2 μm were used, to prepare a honeycomb structure. Densities of the silicon powder and the cordierite powder were the same values as in Example 1. A density of the $Si_3N_4$ powder was 3.44 g/cm³. A density of the mullite powder was the same value as in Example 22.

Example 28

The procedures of Example 1 were repeated except that as an electrode section forming raw material, 58 g of silicon powder of 5 μm, 42 g of silicon carbide powder of 0.5 μm and 8.1 g of cordierite powder of 2 μm were used, to prepare a honeycomb structure. Densities of the silicon powder, the silicon carbide powder and the cordierite powder were the same values as in Example 1.

Example 29

The procedures of Example 1 were repeated except that as an electrode section forming raw material, 63 g of silicon powder of 5 μm, 37 g of silicon carbide powder of 0.5 μm and 8.2 g of cordierite powder of 2 μm were used, to prepare a honeycomb structure. Densities of the silicon powder, the silicon carbide powder and the cordierite powder were the same values as in Example 1.

Example 30

The procedures of Example 1 were repeated except that as an electrode section forming raw material, 58 g of silicon powder of 5 μm, 42 g of alumina powder of 0.2 μm and 7.5 g of cordierite powder of 2 μm were used, to prepare a honeycomb structure. Densities of the silicon powder and the cordierite powder were the same values as in Example 1. A density of the alumina powder was the same value as in Example 26.

Example 31

The procedures of Example 1 were repeated except that as an electrode section forming raw material, 58 g of silicon powder of 5 μm, 42 g of silicon carbide powder of 12 μm and 5.0 g of cordierite powder of 2 μm were used, to prepare a honeycomb structure. Densities of the silicon powder, the silicon carbide powder and the cordierite powder were the same values as in Example 1.

Example 32

The procedures of Example 1 were repeated except that as an electrode section forming raw material, 58 g of silicon powder of 5 μm, 42 g of silicon carbide powder of 12 μm and 5.0 g of cordierite powder of 2 μm were used, prepare a honeycomb structure. Densities of the silicon powder, the silicon carbide powder and the cordierite powder were the same values as in Example 1. In Example 32, the electrode section forming ram material was applied to a dried honeycomb body, the electrode section forming raw material was dried, and then end portions of the electrode section forming raw material were cut, and tilted. Afterward, a surface coating layer forming raw material was applied to cover the electrode section forming raw material. As the surface coating layer forming raw material, there was used a slurry obtained by mixing 10 g of silicon carbide powder of 3 μm (a density of 3.17 g/cm³), 1 g of cordierite powder of 2 μm (a density of 2.65 g/cm³), 50 g of water, and 0.1 g of a polyacrylic dispersant.

Example 33

The procedures of Example 32 were repeated except that as an electrode section forming raw material, 52 g of silicon powder of 5 μm, 48 g of silicon carbide powder of 43 μm and 5.0 g of cordierite powder were used, to prepare a honeycomb structure. Densities of the silicon powder and the cordierite powder were the same values as in Example 1.

Comparative Example 1

The procedures of Example 1 were repeated except that as an electrode section forming raw material, 42 g of silicon powder of 5 μm, 58 g of silicon carbide powder of 43 μm and 4.8 g of cordierite powder were used, to prepare a honeycomb structure. Densities of the silicon powder, the silicon carbide powder and the cordierite powder were the same values as in Example 1.

Comparative Example 2

The procedures of Example 1 were repeated except that as an electrode section forming raw material, 47 g of silicon powder of 5 μm, 53 g of silicon carbide powder of 43 μm and 4.9 g of cordierite powder were used, to prepare a honeycomb structure. Densities of the silicon powder, the silicon carbide powder and the cordierite powder were the same values as in Example 1.

Comparative Example 3

The procedures of Example 1 were repeated except that as an electrode section forming raw material, 52 g of silicon powder of 5 μm, 43 g of silicon carbide powder of 43 μm, and 5.0 g of cordierite powder were used, to prepare a honeycomb structure. Densities of the silicon powder, the silicon carbide powder, and the cordierite powder were the same values as in Example 1.

Comparative Example 4

The procedures of Example 1 were repeated except that as an electrode section forming raw material, 100 g of silicon powder of 5 was used, to prepare a honeycomb structure. A density of the silicon powder was the same value as in Example 1. Here, in Table 3, there are shown constitutions of silicon powder, an aggregate and an oxide used in Examples 22 to 33, and Comparative Examples 1 to 4. Moreover, as to Examples 32 and 33, in "a type" column of surface coat of Table 3, a type of a surface coating layer is shown. As to Examples 32 and 33, in "a thickness (km)" column of the surface coat of Table 3, a thickness of the surface coating layer is shown.

TABLE 3

| | Silicon | | Aggregate | | | Oxide | | Others | | Surface coat | |
|---|---|---|---|---|---|---|---|---|---|---|---|
| | Particle dia. (μm) | Vol % | Type | Particle dia. (μm) | Vol % | Type | Parts by volume | Type | at % | Type | Thickness (μm) |
| Example 22 | 5 | 65 | SiC Mullite | 3 2 | 28 7 | Oxide A | 5 | — | | — | |
| Example 23 | 5 | 65 | SiC Mullite | 3 2 | 17.5 17.5 | Oxide A | 5 | — | | — | |
| Example 24 | 5 | 65 | SiC Mullite | 3 2 | 7 28 | Oxide A | 5 | — | | — | |
| Example 25 | 5 | 65 | Mullite | 2 | 35 | Oxide A | 5 | — | | — | |
| Example 26 | 5 | 70 | SiC Alumina | 3 0.2 | 24 6 | Oxide A | 5 | — | | — | |
| Example 27 | 5 | 70 | $Si_3N_4$ Mullite | 0.6 2 | 6 24 | Oxide A | 5 | — | | — | |
| Example 28 | 5 | 65 | SiC | 0.5 | 35 | Oxide A | 8 | — | | — | |
| Example 29 | 5 | 70 | SiC | 0.5 | 30 | Oxide A | 8 | — | | — | |
| Example 30 | 5 | 70 | Alumina | 0.2 | 30 | Oxide A | 8 | — | | — | |
| Example 31 | 5 | 65 | SiC | 12 | 35 | Oxide A | 5 | — | | — | |
| Example 32 | 5 | 65 | SiC | 12 | 35 | Oxide A | 5 | — | | SiC/cordierite | 10 |
| Example 33 | 5 | 60 | SiC | 43 | 40 | Oxide A | 5 | — | | SiC/cordierite | 10 |
| Comparative Example 1 | 5 | 50 | SiC | 43 | 50 | Oxide A | 5 | — | | — | |
| Comparative Example 2 | 5 | 55 | SiC | 43 | 45 | Oxide A | 5 | — | | — | |
| Comparative Example 3 | 5 | 60 | SiC | 43 | 40 | Oxide A | 5 | — | | — | |
| Comparative Example 4 | 5 | 100 | — | | | — | | — | | — | |

*1: The oxide A is $MgO-Al_2O_3-SiO_2$.

In Table 4, there are shown amounts of impurities in silicon (the silicon powder) used in the respective examples and comparative examples. It is to be noted that in Table 4, there is shown a ratio (at %) of an atomic number of the impurities to an atomic number of silicon.

TABLE 4

| Amount of impurities in silicon | |
|---|---|
| Fe | 0.22 at % |
| Al | 0.31 at % |
| Ca | 0.04 at % |
| Ti | 0.02 at % |
| P | 0.004 at % |
| B | 0.005 at % |

Moreover, as to the honeycomb structures of Examples 1 to 33 and Comparative Examples 1 to 4, shape changes of the electrode sections were evaluated by the following method. The results are shown in Table 5. Moreover, as to the obtained honeycomb structures, there were measured an electrical resistivity (Ωcm) of the electrode section, a percentage (vol %) of silicon in the electrode section, a porosity (%) of the electrode section and a thickness (μm) of the electrode section, by the following method. The results are shown in Table 5. As to the honeycomb structure of Comparative Example 4, the shape of the electrode section was deformed, and hence the evaluation of the shape change of the electrode section was only performed.

(Shape Change of Electrode Section)

An appearance of each manufactured honeycomb structure was observed, to confirm jetting of silicon from each electrode section, warp of the electrode section, and deformation of the electrode section. When all of the jetting of silicon from the electrode section, the warp of the electrode section and the deformation of the electrode section were not confirmed, "none" is described in a column of "the shape change of the electrode section" of Table 5. When the jetting of silicon from the electrode section was confirmed, "the jetting" is described in the column of "the shape change of the electrode section" of Table 5. When the warp of the electrode section was confirmed, "the warp" is described in the column of "the shape change of the electrode section" of Table 5. When the deformation of the electrode section was confirmed, "the deformation" is described in the column of "the shape change of the electrode section" of Table 5.

(Electrical Resistivity (Ωcm) of Electrode Section)

Each electrode section of each obtained honeycomb structure was cut out to prepare a measurement sample, and an electrical resistivity of the measurement sample was measured at room temperature by a four-terminals method.

(Silicon in Electrode Section (vol %))

In the evaluation of the shape change of the electrode section, when the jetting of silicon from the electrode section was not confirmed, a percentage (vol %) of silicon in the electrode section was obtained from a blend ratio of the electrode section forming raw material. Moreover, in the evaluation of the shape change of the electrode section, when the jetting of silicon from the electrode section was confirmed, an amount of jetted silicon was measured, and an amount of remaining silicon in the electrode section was calculated and obtained. The amount of silicon prior to the jetting of silicon was obtained from the blend ratio of the electrode section forming raw material.

(Porosity (%) of Electrode Section)

The porosity of the electrode section was calculated and obtained by image analysis of an image obtained by a scanning electron microscope (SEM).

(Thickness (μm) of Electrode Section)

A thickness of the electrode section was measured by the image analysis of the image obtained by the scanning electron microscope (SEM).

TABLE 5

| | Electrical resistivity of electrode section (Ωcm) | Shape change of electrode section | Silicon in electrode section (vol %) | Electrode section Porosity (%) | Electrode section Thickness (μm) |
|---|---|---|---|---|---|
| Example 1 | 0.32 | None | 60 | 25 | 220 |
| Example 2 | 0.25 | None | 65 | 24 | 180 |
| Example 3 | 0.39 | Jetting | 61 | 30 | 180 |
| Example 4 | 0.34 | Jetting | 63 | 32 | 180 |
| Example 5 | 0.25 | Jetting | 68 | 23 | 180 |
| Example 6 | 0.30 | None | 70 | 26 | 180 |
| Example 7 | 0.17 | None | 70 | 8 | 120 |
| Example 8 | 0.13 | None | 75 | 6 | 120 |
| Example 9 | 0.10 | None | 80 | 6 | 120 |
| Example 10 | 0.19 | None | 75 | 15 | 80 |
| Example 11 | 0.15 | None | 75 | 10 | 100 |
| Example 12 | 0.38 | None | 65 | 38 | 270 |
| Example 13 | 0.32 | None | 65 | 32 | 200 |
| Example 14 | 0.24 | None | 65 | 11 | 150 |
| Example 15 | 0.28 | Warp | 65 | 15 | 120 |
| Example 16 | 0.30 | None | 65 | 28 | 180 |
| Example 17 | 0.19 | None | 65 | 6 | 150 |
| Example 18 | 0.17 | None | 65 | 5 | 150 |
| Example 19 | 0.23 | None | 65 | 12 | 170 |
| Example 20 | 0.22 | None | 65 | 11 | 160 |
| Example 21 | 0.15 | None | 65 | 24 | 180 |
| Example 22 | 0.22 | None | 65 | 8 | 160 |
| Example 23 | 0.17 | None | 65 | 6 | 150 |
| Example 24 | 0.19 | None | 65 | 11 | 150 |
| Example 25 | 0.36 | Jetting | 61 | 32 | 170 |
| Example 26 | 0.17 | None | 70 | 8 | 150 |
| Example 27 | 0.22 | None | 70 | 11 | 150 |
| Example 28 | 0.29 | None | 65 | 27 | 150 |
| Example 29 | 0.21 | None | 70 | 18 | 120 |
| Example 30 | 0.28 | None | 70 | 22 | 120 |
| Example 31 | 0.40 | Jetting | 60 | 36 | 180 |
| Example 32 | 0.24 | None | 65 | 18 | 150 |
| Example 33 | 0.30 | None | 60 | 21 | 150 |
| Comparative Example 1 | 0.53 | None | 50 | 44 | 180 |
| Comparative Example 2 | 0.42 | Jetting | 53 | 35 | 150 |
| Comparative Example 3 | 0.54 | Jetting | 51 | 45 | 150 |
| Comparative Example 4 | — | Deformation | — | — | — |

(Conclusion)

As shown in Table 5, in each of the honeycomb structures of Examples 1 to 33, the electrical resistivity of each of the electrode sections was low. Moreover, in each of Examples 3 to 5, 25, and 31, the jetting of silicon from the electrode section was confirmed, but a level thereof did not have any problems during use of the honeycomb structure. However, an amount of silicon in the electrode section decreased as much as silicon jetted from the electrode section, as compared with the percentage (vol %) of the volume of silicon in the electrode section forming raw material, and hence the electrical resistivity was high, as compared with the other examples. In Example 15, the warp of the electrode section was confirmed, but a level thereof did not have any problems during the use of the honeycomb structure. Additionally, in each of the honeycomb structures of Examples 1 to 33 and Comparative Examples 1 to 4, the electrical resistivity of the honeycomb structure body at 400° C. was 40 Ωcm. Furthermore, as a result of quantitative analysis of each of the electrode sections of the honeycomb structures of Examples 1 to 33 and Comparative Examples 1 to 3 by an X-ray diffraction method (XRD), there were obtained the same results in vol % of silicon and the aggregate and parts by volume of an oxide shown in Table 1 to Table 3. The quantitative analysis of the electrode section by the XRD was performed by fitting, by a WPPD method, an XRD pattern measured by the X-ray diffraction method (XRD).

Hereinafter, the results shown in Table 5 will be considered for each of the examples and comparative examples. (1) In Example 1, the amount of silicon in the electrode sections was large, and hence the electrical resistivity was low, as compared with Comparative Examples 1 to 3. (2) As in Example 2, when the amount of silicon in the electrode sections in Example 1 was increased, the electrical resistivity was lower than that of Example 1. (3) As in Example 3, when the average particle diameter of the silicon powder used in the electrode section forming raw material was small, the jetting of silicon from the electrode sections was confirmed. As a result, the electrical resistivity was higher than that of Example 2. (4) As in Example 4, when the amount of the silicon powder used in the electrode section forming raw material was increased, the jetting of silicon from the electrode sections was confirmed. As a result, the electrical resistivity was higher than that of Example 2. (5) As in Example 5, when the average particle diameter of the silicon powder used in the electrode section forming raw material was larger than that of Example 4, the jetting of silicon from the electrode sections decreased as compared with Example 4, and the electrical resistivity was lower than that of Example 4. (6) As in Example 6, when the average particle diameter of the silicon powder was large, the porosity was high, and the electrical resistivity was higher than that of Example 5. (7) As in Example 7, when the surface coating was performed, it was possible to increase the amount of the silicon powder, and the electrical resistivity was lower than that of each of Examples 1 to 6. (8 and 9) As in Examples 8 and 9, when the amount of the silicon powder in Example 7 was further increased, the electrical resistivity further lowered.

(10 and 11) As in Examples 10 and 11, even when the type of the surface coating layer was changed, it was possible to increase the amount of the silicon powder, and the electrical resistivity was low as compared with Examples 1 to 6. (12) As in Example 12, when the oxide was not contained in the electrode section forming raw material, the porosity was higher than that of Example 2, and the electrical resistivity was higher than that of Example 2. (13) As in Example 13, when the amount of the oxide in the electrode section forming raw material was small, the porosity was higher than that of Example 2, and the electrical resistivity was higher than that of Example 2. (14) As in Example 20, when the amount of the oxide in the electrode section forming raw material was large, the porosity was lower than that of Example 2, but the electrical resistivity lowered less. (15) As in Example 15, when the amount of the oxide in the electrode section forming raw material in Example 14 was further increased, the porosity and the electrical resistivity were higher than those of Example 14. Moreover, warp occurred in the electrode sections. (16) As in Example 16, when SrO was contained as the oxide, the porosity and the electrical resistivity were lower than those of Example 13. (17) As in Example 17, when Ni was added to Example 2, the porosity was low, and the electrical resistivity was low. (18) As in Example 18, even when the amount of Ni in Example 17 was increased, characteristics did not noticeably change, but thermal expansion increased.

(19 to 21) As in Examples 19 to 21, even when the type or the amount of the other component of Example 17 was changed, it was possible to realize the electrical resistivity of the degree as in Example 17 (22) As in Example 22, when the aggregate of Example 2 was mixed with mullite, the porosity was low, and the electrical resistivity was low. (23) As in Example 23, when the amount of mullite in Example 22 was increased (SiC/mullite=50/50), the porosity was low, and the electrical resistivity was low. (24) As in Example 24, when the amount of mullite in Example 23 was further increased (SiC/mullite=20/80), the electrical resistivity was higher than that of Example 23. (25) As in Example 25, when mullite was only used differently from Example 24, the jetting of silicon from the electrode sections was confirmed, and the electrical resistivity was higher than that of Example 24. (26) As in Example 26, when the aggregate of Example 4 was mixed with alumina, the porosity was low, and the electrical resistivity was low. (27) As in Example 27, even when the silicon nitride ($Si_3N_4$) powder and the mullite powder were used as the aggregate, the electrical resistivity was low. (28) As in Example 28, when the average particle diameter of the aggregate (SiC) of Example 2 was decreased, the porosity was high, and the electrical resistivity was higher than that of Example 2. (29) As in Example 29, when the average particle diameter of the aggregate (SiC) in Example 4 was decreased, it was possible to increase the amount of the silicon powder, and the electrical resistivity was lower than that of Example 4. (30) As in Example 30, when the aggregate of Example 29 was changed to alumina powder having a small average particle diameter, the porosity was high, and the electrical resistivity was higher than that of Example 29. Furthermore, the thermal expansion was large.

(31) As in Example 31, when the average particle diameter of the aggregate (SiC) in Example 2 was increased, the jetting of silicon from the electrode sections was confirmed, and the electrical resistivity was higher than that of Example 2. (32) As in Example 32, when the surface coating was performed in addition to Example 31, silicon did not jet from the electrode sections, and the electrical resistivity was lower than that of Example 31. (33) As in Example 33, when the surface coating was performed in addition to Comparative Example 3, silicon did not jet from the electrode sections, and the electrical resistivity was, lower than that of Comparative Example 3. (34) As in Comparative Example 1, when the amount of silicon in the electrode sections was smaller than 60 vol %, the electrical resistivity was very high. (35) As in Comparative Example 2, when the amount of the silicon powder in Comparative Example 1 was increased, a large amount of silicon jetted from the electrode sections. As a result, the amount of silicon in the electrode sections was smaller than 60 vol %, and the electrical resistivity was very high. (36) As in Comparative Example 3, when the amount of the silicon powder in Comparative Example 2 was further increased, the amount of silicon jetted from the electrode sections further increased. As a result, the amount of silicon in the electrode sections was smaller than 60 vol %, and the electrical resistivity was very high. (37) As in Comparative Example 4, when the aggregate was not contained in the electrode sections, the electrode sections were deformed, and it was not possible to maintain the shape of the electrode sections.

A honeycomb structure of the present invention can suitably be utilized as a catalyst carrier for an exhaust gas purifying device which purifies an exhaust gas of a car.

Description of Reference Symbols

1: partition wall, 2: cell, 3: outer peripheral wall, 4: honeycomb structure body, 5: side, surface, 11: first end surface, 12: second end surface, 21: electrode section, 21a: tilting portion, 23: surface coating layer, 100 and 200: honeycomb structure, O: center, α: central angle, β: angle formed by line segments P and Q, P: line segment connecting a center point of one electrode section to the center of the honeycomb structure body, Q: line segment connecting a center point of the other electrode section to the center of the honeycomb structure body, and θ: angle of 0.5 times the central angle.

What is claimed is:
1. A honeycomb structure comprising:
a tubular honeycomb structure body having porous partition walls to define and form a plurality of cells as through channels of a fluid which extend from a first end surface as one end surface to a second end surface as the other end surface, and an outer peripheral wall positioned on the outermost periphery; and a pair of electrode sections disposed on a side surface of the tubular honeycomb structure body, wherein an electrical resistivity of the tubular honeycomb structure body is from 1 to 200 Ωcm, each of the pair of electrode sections is formed into a band shape extending in an extending direction of the plurality of cells of the tubular honeycomb structure body, in a cross section perpendicular to the extending direction of the plurality of cells, one electrode section in the pair of electrode sections is disposed on a side opposite to the other electrode section in the pair of electrode sections via the center of the tubular honeycomb structure body, each of the electrode sections contains silicon and an aggregate, and a ratio of a volume of the silicon to be contained in the electrode section to a volume of the aggregate to be contained in the electrode section is from 60/40 to 80/20.

2. The honeycomb structure according to claim 1, wherein an average particle diameter of the aggregate is from 0.1 to 5 μm.

3. The honeycomb structure according to claim 1, wherein the aggregate includes particles made of a material including at least one selected from the group consisting of silicon carbide, silicon nitride, mullite, and alumina.

4. The honeycomb structure according to claim 3, wherein the aggregate includes particles made of silicon carbide and particles made of mullite, and a ratio of a volume of the particles made of the silicon carbide to a volume of the particles made of the mullite is from 20/80 to 80/20.

5. The honeycomb structure according to claim 1, wherein each of the electrode sections further contains an alkaline earth metal oxide, $Al_2O_3$, and $SiO_2$.

6. The honeycomb structure according to claim 5, wherein the alkaline earth metal oxide is MgO.

7. The honeycomb structure according to claim 5, wherein each of the electrode sections contains the alkaline earth metal oxide, $Al_2O_3$, and $SiO_2$ as much as 2 to 10 parts by volume in total, when a total volume of the silicon and the aggregate is 100 parts by volume.

8. The honeycomb structure according to claim 1, wherein each of the electrode sections contains at least one selected from the group consisting of Ni, Co, Fe, Ca, Al, B, and P as a component in the silicon to be contained in the electrode section.

9. The honeycomb structure according to claim 8, wherein each of the electrode sections contains the at least one selected from the group as the component in the silicon at an atomic number ratio of 0.1 to 10 at % to an atomic number of the silicon.

10. The honeycomb structure according to claim 1, wherein each of in the electrode sections, the silicon is an n-type semiconductor.

11. The honeycomb structure according to claim 1, wherein a porosity of each of the electrode sections is from 5 to 40%.

12. The honeycomb structure according to claim 1, wherein a thickness of each of the electrode sections is from 50 to 300 μm.

13. The honeycomb structure according to claim 1, further comprising:

a surface coating layer disposed to cover at least part of a surface of each of the electrode sections.

14. The honeycomb structure according to claim 13, wherein the surface coating layer is made of a material including at least one selected from the group consisting of silicon carbide, silicon nitride, mullite, and alumina.

15. The honeycomb structure according to claim 14, wherein the surface coating layer further contains an alkaline earth metal oxide, $Al_2O_3$, and $SiO_2$.

16. The honeycomb structure according to claim 13, wherein a thickness of the surface coating layer is from 0.5 to 50 μm.

17. A manufacturing method of a honeycomb structure comprising:

an electrode section forming step of applying an electrode section forming raw material to each of a first region and a second region of a side surface of a tubular honeycomb structure body having partition walls to define and form a plurality of cells as through channels of a fluid which extend from a first end surface as one end surface to a second end surface as the other end surface, and an outer peripheral wall positioned on the outermost periphery, or a fired tubular honeycomb structure body obtained by firing the tubular honeycomb structure body, and drying and firing the applied electrode section forming raw material, to form a pair of electrode sections, wherein in the electrode section forming step, the electrode section forming raw material is applied in a band shape so that in a cross section perpendicular to an extending direction of the plurality of cells of the tubular honeycomb structure body or the fired tubular honeycomb structure body, the first region is positioned on a side opposite to the second region via the center of the tubular honeycomb structure body or the fired tubular honeycomb structure body, the electrode section forming raw material includes silicon and an aggregate, and a ratio of a volume of the silicon to be included in the electrode section forming raw material to a volume of the aggregate to be included in the electrode section forming raw material is from 60/40 to 80/20, and wherein the fired tubular honeycomb structure body has an electrical resistivity of from 1 to 200 Ωcm.

18. The manufacturing method of the honeycomb structure according to claim 17, wherein as the silicon to be included in the electrode section forming raw material, silicon powder having an average particle diameter of 5 to 15 μm is used.

19. The manufacturing method of the honeycomb structure according to claim 17, wherein a content of silicon in the silicon powder is from 90.0 to 99.9 at %.

20. The manufacturing method of the honeycomb structure according to claim 17, wherein the electrode section forming raw material applied to the first region and the second region is dried, and then a surface coating layer forming raw material is applied to at least part of the surface of the electrode section forming raw material.

\* \* \* \* \*